United States Patent
Fujimoto et al.

(10) Patent No.: US 7,734,845 B2
(45) Date of Patent: Jun. 8, 2010

(54) INPUT/OUTPUT CONTROL APPARATUS, INPUT/OUTPUT CONTROL SYSTEM, AND INPUT/OUTPUT CONTROL METHOD

(75) Inventors: Hiroshi Fujimoto, Yokohama (JP); Takashi Suzuki, Yokohama (JP); Ken Ohta, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 12/190,111

(22) Filed: Aug. 12, 2008

(65) Prior Publication Data

US 2008/0307124 A1    Dec. 11, 2008

Related U.S. Application Data

(62) Division of application No. 11/623,934, filed on Jan. 17, 2007.

(30) Foreign Application Priority Data

Jan. 17, 2006  (JP)  ............................ 2006-009190
Dec. 19, 2006  (JP)  ............................ 2006-341835

(51) Int. Cl.
  *G06F 3/00*  (2006.01)
  *G06F 5/00*  (2006.01)
(52) U.S. Cl. .............................. 710/36; 710/12; 710/38
(58) Field of Classification Search ................... 710/12, 710/36, 38
See application file for complete search history.

(56) References Cited

U.S. PATENT DOCUMENTS 5,483,647 A * 1/1996 Yu et al. ..................... 713/100

2004/0078682 A1 * 4/2004 Huang ......................... 714/37
2004/0205755 A1   10/2004 Lescouet et al.

OTHER PUBLICATIONS

Torvalds, et al., "Linux kernel 2.6.15, File vt_ioctl.c", [Online], XP002461989, Jan. 3, 2006, pp. 1-15.
The Xen Team, "Xen 2.0.7, File console.c", [Online], XP002461990, Aug. 4, 2005, pp. 1-10.

(Continued)

*Primary Examiner*—Alford W Kindred
*Assistant Examiner*—Farley J Abad
(74) *Attorney, Agent, or Firm*—Oblon, Spivak, McClelland, Maier & Neustadt, L.L.P.

(57) ABSTRACT

An input/output control apparatus includes: a request acceptance unit configured to accept a switch request for requesting to change an operating system occupying any one of the input device and the output device; a control information generator unit configured to generate control information including any one of input destination information and output enable information in response to the switch request; and a control information output unit configured to output any one of the input destination information and the output enable information. The input destination information includes at least information for specifying an input destination operating system to which information inputted from the input device is inputted; and the output enable information includes at least information for specifying whether or not each of the plurality of operating systems can output information to the output device.

3 Claims, 8 Drawing Sheets

OTHER PUBLICATIONS

The Xen Team, "Xen Users' Manual", Xen Users' Manual, XP002375304, Aug. 9, 2004, pp. 1-50 and 5 cover.

Paul Barham, et al., "Xen and the Art of Virtualization", In Proc. of Symposium on operation systems Principles (SOSP), 2003, (http://www.Cl.cam.ac.uk/Research/SRG/netos/papers/2003-xensosp.pdf), 14 pages.

S. Torii, et al., "A 600MIPS 120mW 70/spl mu/A leakage triple-CPU mobile application processor chip", In Proc. of IEEE International Solid-State Circuits Conference (ISSCC), Session 7, 2005, pp. 136-137, 589 with English Abstract (1 page), and Lecture notes (24 pages).

The Xen Team, "Xen Users' Manual", Xen v2.0 for x86, University of Cambridge, Dec. 9, 2005, pp. 1-33.

\* cited by examiner

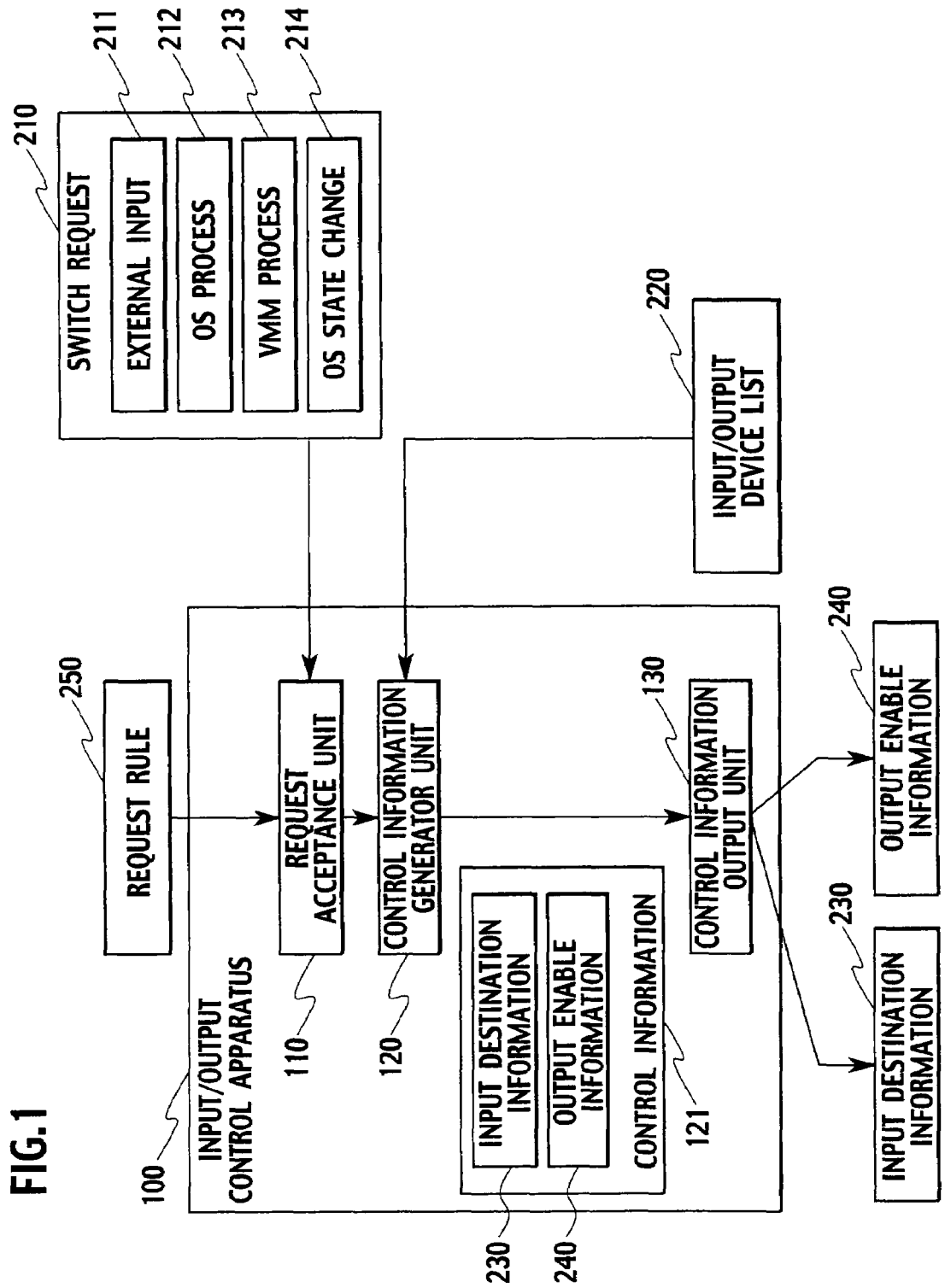

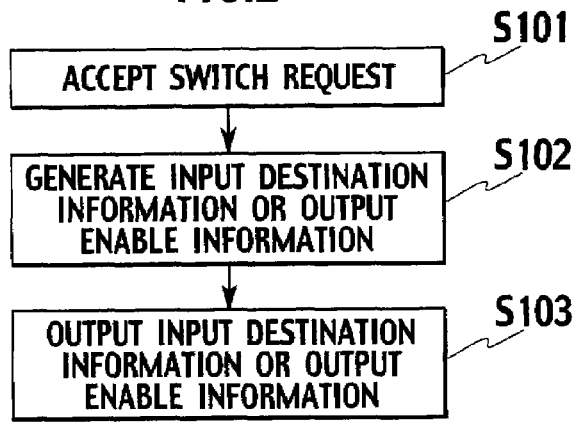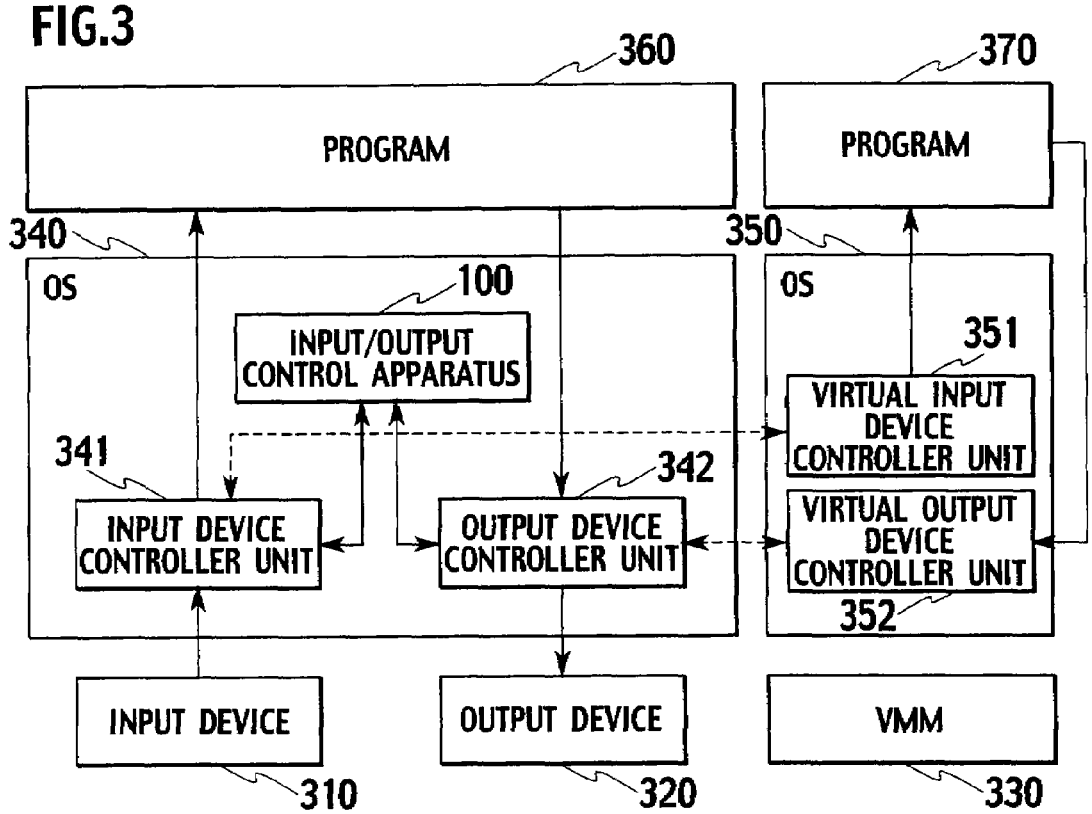

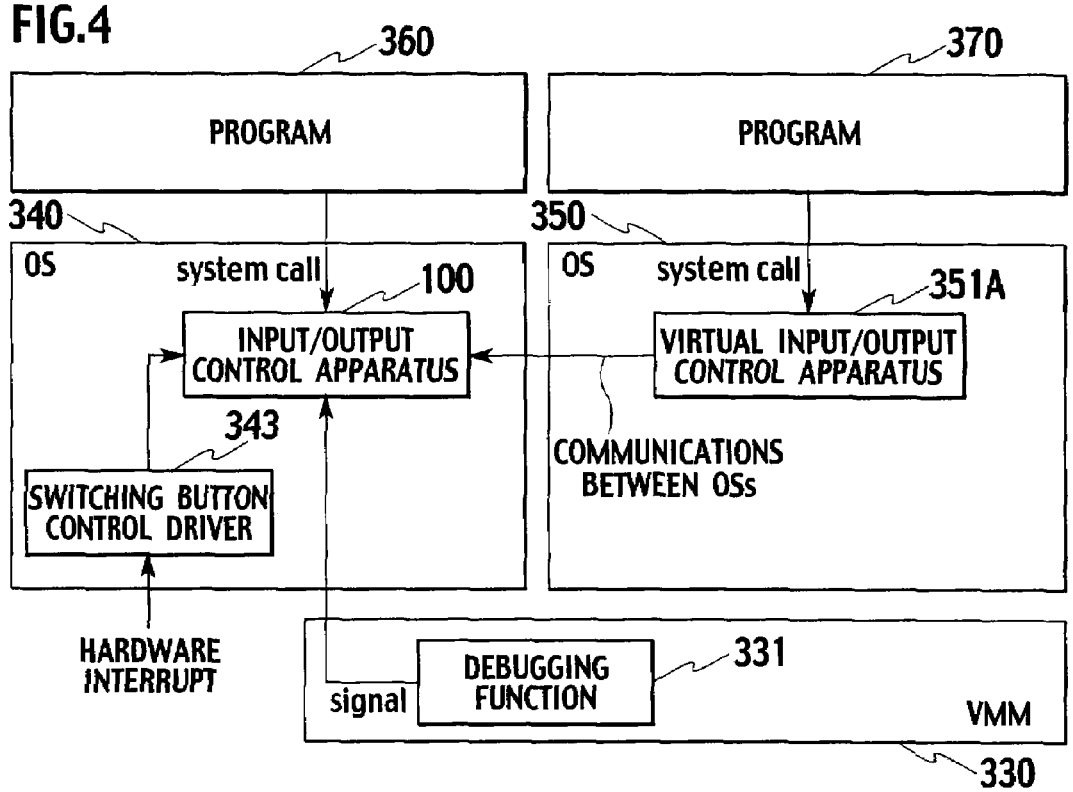
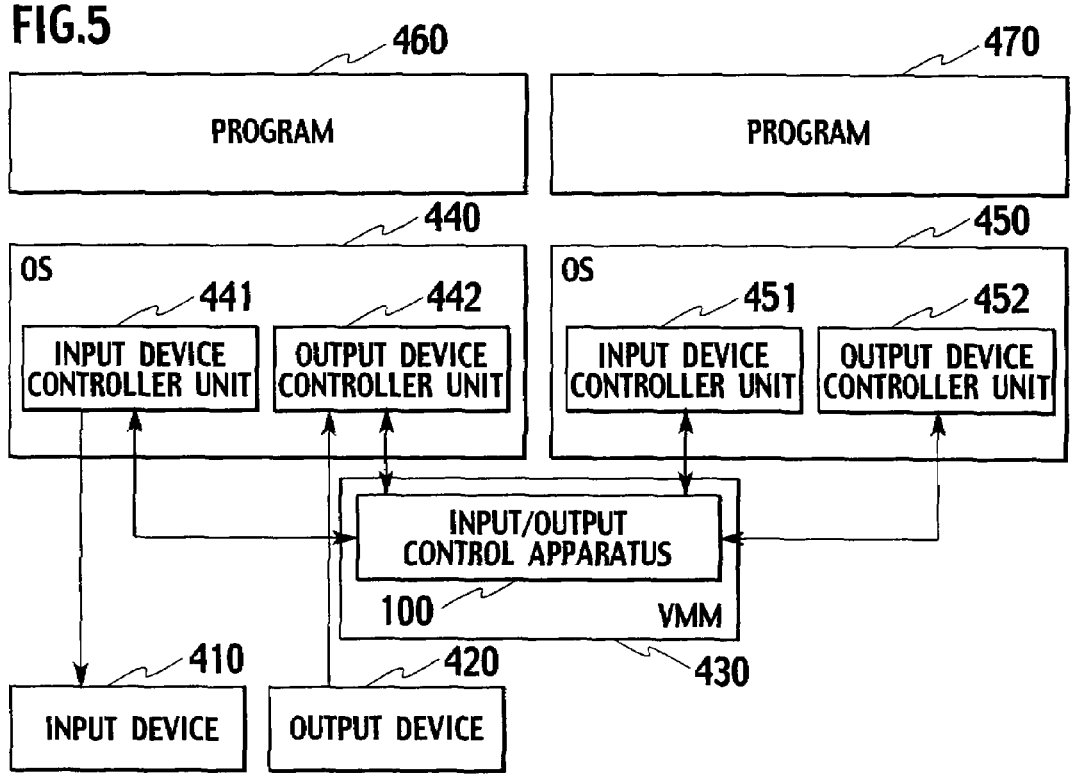

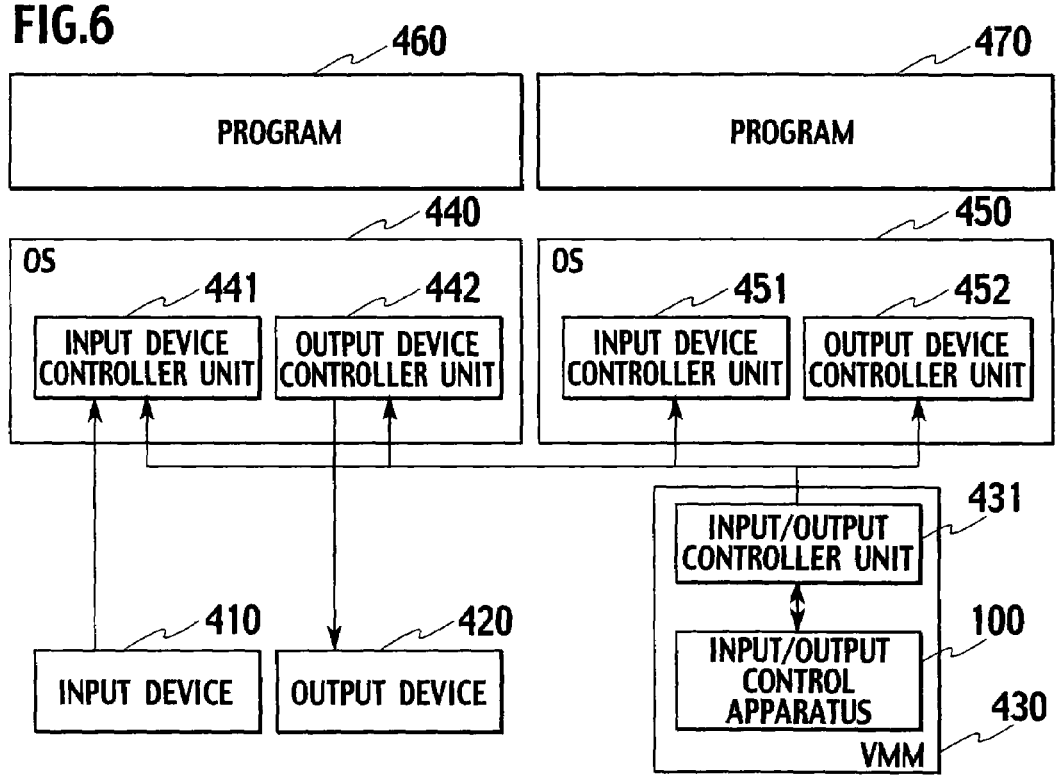
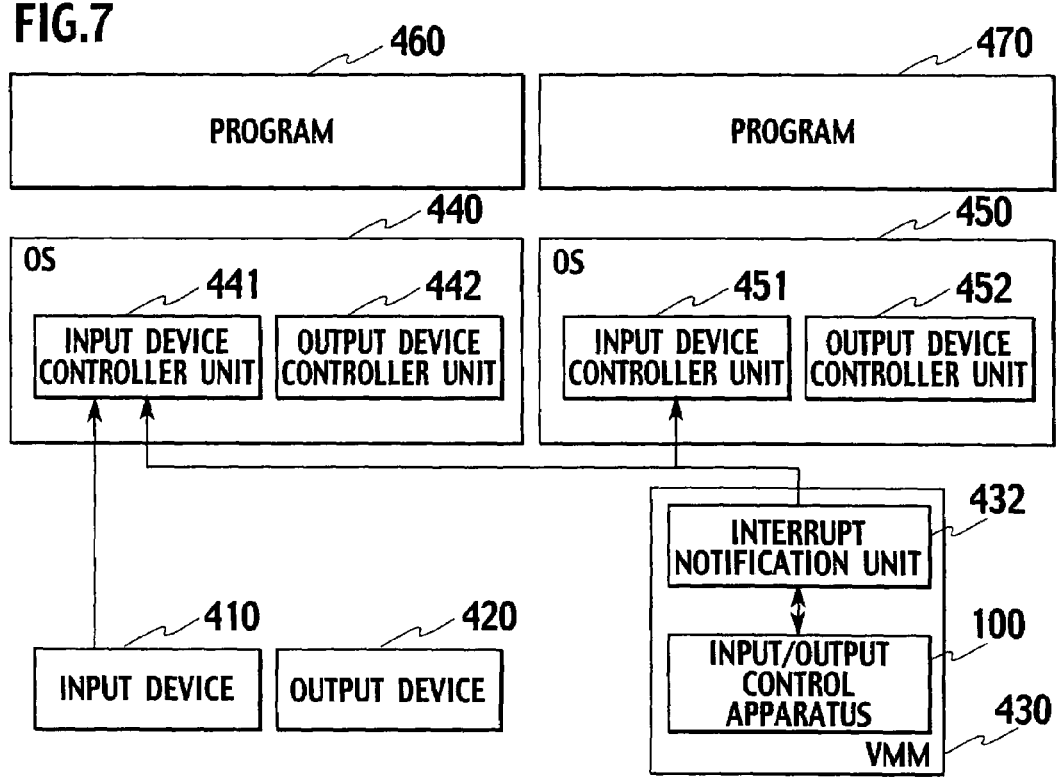

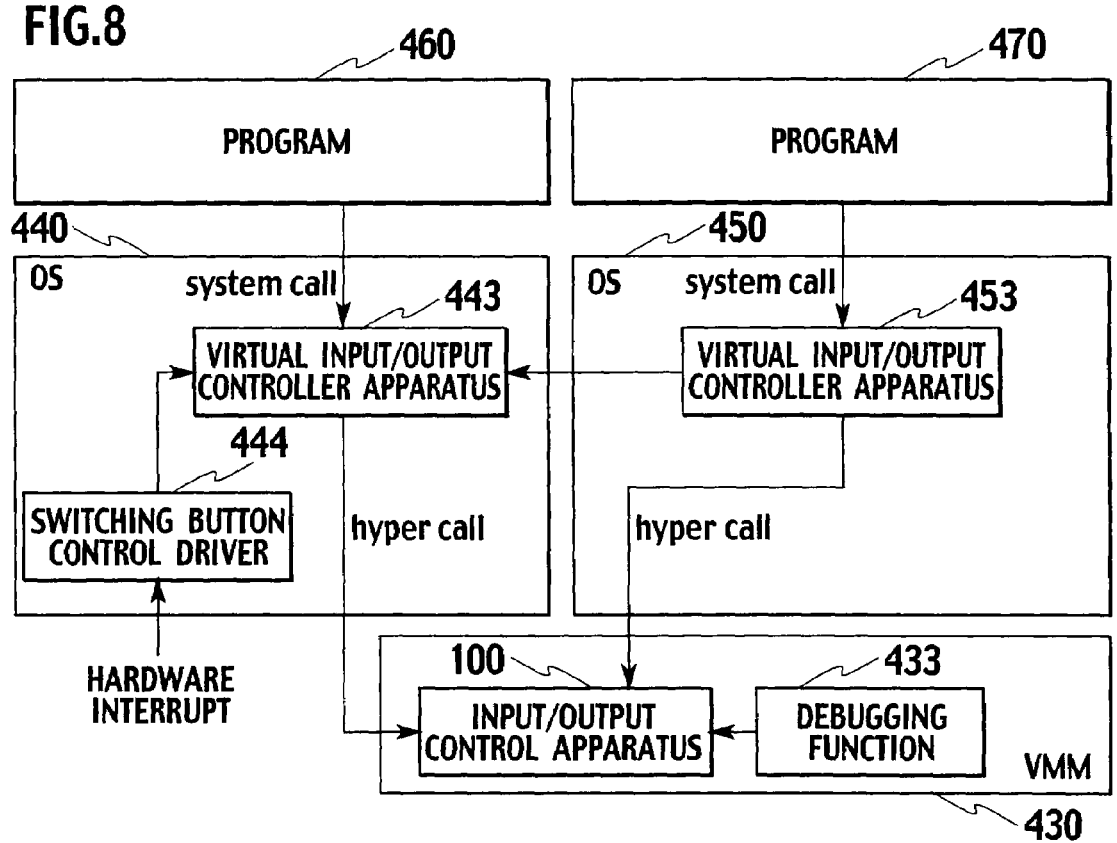
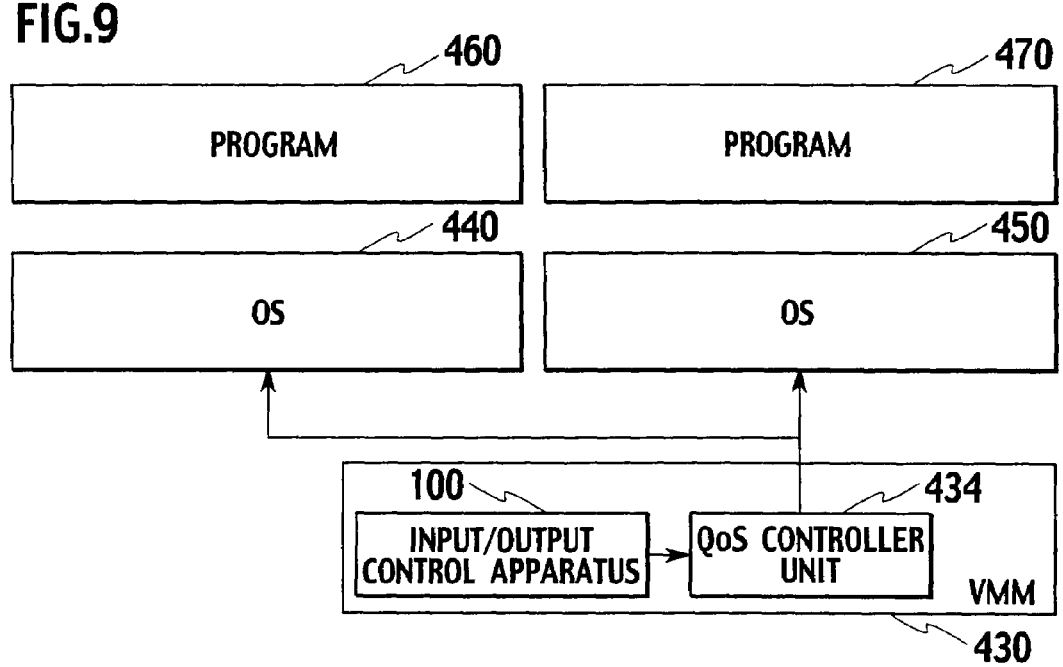

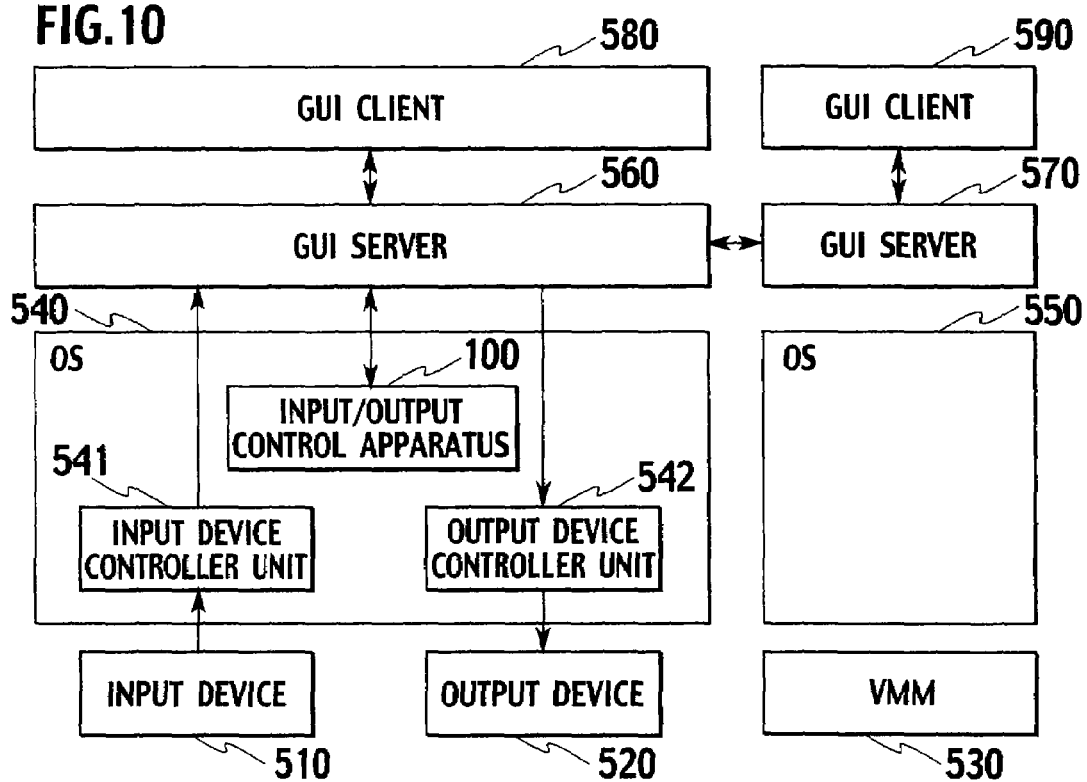
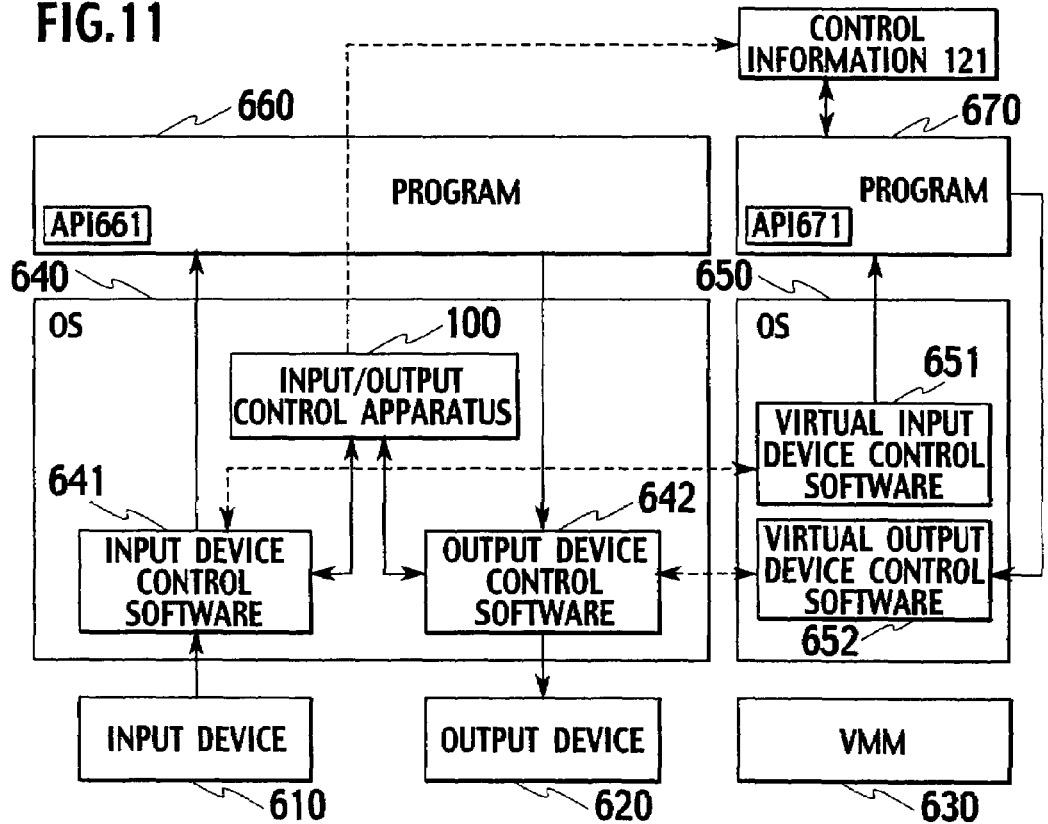

INPUT/OUTPUT CONTROL APPARATUS, INPUT/OUTPUT CONTROL SYSTEM, AND INPUT/OUTPUT CONTROL METHOD

CROSS REFERENCE TO RELATED APPLICATION

This application is a divisional of U.S. application Ser. No. 11/623,934, filed Jan. 17, 2007, which claims priority under 35 U.S.C. §119 to Japanese Patent Application No. P2006-009190, filed on Jan. 17, 2006; and Japanese Patent Application No. P2006-341835, filed on Dec. 19, 2006; the entire contents of each of which are incorporated herein by reference.

BACKGROUND OF THE INVENTION

1. Field of the Invention

The present invention relates to an input/output control apparatus, an input/output control system, and an input/output control method, which control shared use of input/output devices by more than one operating system (hereinafter referred to as "OS").

2. Description of the Related Art

In a computer on which a single OS operates, software for controlling input/output devices (hereinafter referred to as "device drivers") allows the OS itself and a program operating on the OS to access the input/output devices provided to the computer, and the device driver is the one installed into the OS as appropriate.

Here, the computer is provided with at least an input device (such as a keyboard) and an output device (such as a display device). The input device is used when inputting information into the OS from the outside of the computer. The output device is used when the OS outputs information from the computer to the outside of the computer.

The device driver registers, to the OS, information on the device to be controlled by the device driver itself, when the device driver is installed into the OS. An interrupt number for the device can be cited as an example of the information on such a device.

When information is inputted to the computer from the outside of the computer, firstly, an interrupt controller sends, to a CPU, an interrupt signal and an interrupt number.

Secondly, upon receipt of the interrupt signal, the CPU stops a process being performed at the time, and then calls a device driver corresponding to the interrupt number.

Thirdly, the device driver accesses the corresponding device, and then passes, to the OS, the information inputted through the device.

Furthermore, when outputting specific information, the OS specifies an appropriate output device in accordance with the content of the specific information.

Thereafter, the OS calls a device driver which has been registered in advance and which corresponds to the output device, and then causes the specific information to be outputted from the output device.

As described above, in a case where a single OS operates on a computer, by managing use of input/output devices, the OS can prevents an occurrence of a conflict situation in which programs operating on the OS access one of the input/output devices at the same time.

On the other hand, in recent years, an environment where multiple OSs can be simultaneously executed on a computer has been becoming prevalent.

As shown in FIG. 12, such an environment can be realized by a host system termed as a "virtual machine monitor (hereinafter referred to as a VMM)". The VMM configures guest systems termed as "virtual machines (hereinafter referred to as VMs)". Then, the VMM operates an OS on each of the VMs (for example, refer to the Patent document 1, the Non-patent document 1 and the Non-patent document 2).

One of conceivable examples of use of such an environment is that a "real-time OS (hereinafter referred to as an RTOS)" specialized in real-time processing, and a "general purpose OS (hereinafter referred to as a GPOS)" used for general purposes are simultaneously operated on a single computer.

Moreover, another example thereof is that each of multiple OSs provides a service specialized in the OS to a client by causing the multiple OSs to be operated on a single sever.

Under such an environment, limited hardware resources including input/output devices have to be shared by multiple OSs.

One of the roles of the VMM is to statically or dynamically allocate hardware resources to each of the OSs.

For example, the VMM dynamically passes the control right of the CPU to each of the OSs, and logically divides and allocates a main memory to each of the OSs, statically. Thereby, the VMM realizes a simultaneous execution of multiple OSs.

Furthermore, among VMMs, there is the one that realizes data communications between the multiple OSs being executed at the same time. In a typical method for executing the data communications, provided is a shared memory to which the multiple OSs can refer.

The VMM performs processes of managing the shared memory, or giving, to the OSs, the notification of writing to or reading from the shared memory.

Such a communications function between OSs is utilized not only when simple data communications are performed between the OSs, but also when hardware resources are shared by the multiple OSs.

For example, consider a case where multiple OSs on a computer provided with only one network interface communicate with the outside of the computer.

In this case, it is hardly conceivable to use a configuration in which each of the OSs independently includes a device driver of a network interface. This is because it is impossible to previously make a judgment on which one of the device drivers of the respective OSs is to be called for a hardware interrupt which occurs when receiving data.

Accordingly, it is necessary that a certain OS becomes only one holder of the device driver, and thereby that the OS being the holder of the device driver be in charge of transferring and receiving data, and assigning the data to each of the OSs.

When hardware resources are shared and utilized as in the case described above, the aforementioned communications function between the OSs becomes a requirement.

Here, consider a device which is to be exclusively occupied by a specific OS at an arbitrary time under a multiple OSs environment realized by a VMM.

As an example of such a device, a human interface device (hereinafter referred to as an "HID") can be cited. As examples of the HID, a keyboard as an input device, a display device as an output device and the like can be cited.

These devices need to be exclusively occupied by the OS, which is being used by a user.

For example, while the user is using a certain program, the result of an input by the user from a keyboard needs to be basically inputted to the certain program, and the result of an output from the certain program needs to be displayed on the display device. For this purpose, the result of the input from the keyboard has to be passed to the OS on which the certain program operates. Likewise, the result of the output from the OS needs to be displayed on the display device.

Moreover, the fact that a user is using a certain OS does not necessary mean that the OS being used by the user also controls the CPU.

Even though the OS is being used by the user, the VMM may switch contexts between OSs. Then, the VMM may assign the CPU to another OS, or execute a process for the VMM itself.

The VMM can grasp which OS controls the CPU at an arbitrary time since the VMM manages the assignment of the CPU. The VMM, however, cannot grasp which OS is being used by the user at an arbitrary time.

Accordingly, for example, in a case where an input of data from the keyboard causes an interrupt, the VMM cannot recognize which OS the interrupt is caused for.

For example, when a network interface is shared by OSs, received data can be assigned after a certain OS receives the data. This can be possible because an IP address, a port number or the like is added to the received data for identifying which OS the data is inputted for.

It is, however, difficult to perform the same processing on data which is inputted from a keyboard.

Likewise, a problem occurs when data is outputted to the display device.

If all of the OSs individually hold the respective display drivers, and output data at their own choices, a conflict for the display device occurs, as a matter of course.

Moreover, even in a case where data to be outputted to a certain OS is aggregated, the correct output result cannot be displayed for the user without recognizing which OS is to output the data at the time.

In the case of the multiple OSs environment described in the Patent document 1, any specific function is not provided in order to solve the problems described above.

This is because the Patent document 1 assumes a simultaneous execution environment of an RTOS and a GPOS. That is, an assumption is made that the GPOS always occupies an HID.

On the other hand, in the multiple OSs environment described in the Non-patent document 1 or the Non-Patent document 2, as shown in FIG. 13, the sharing of an HID is achieved by providing one host OS to the environment, and then by causing a Graphical User Interface (GUI) server of the host OS to process inputs and outputs to the HID for all the other guest OSs.

To be more precise, only the host OS holds the device driver (HID DD) of the HID, and the device driver is allowed to process only the inputs and outputs from the GUI server of the host OS.

The GUI server of the host OS generates a window for each of the guest OSs other than the host OS, and outputs, on the window, the result of output which is received from a GUI server of the guest OS through communications between OSs by using the VMM.

Furthermore, in a case where the window is active, the result of an input from the input device is passed to the GUI server of the corresponding guest OS through the communications between the OSs.

There are, however, problems in such a solution by means of GUI servers.

The first problem is that contexts need to be switched between OSs very often since all of the GUI client applications of the respective OSs perform input and output processing separately.

Under the multiple OSs environment, it takes a long time to perform processes for saving and restoring contexts when the contexts are switched between the OSs. In particular, context switching becomes a large bottleneck in output processing to a display device since a processing speed is important in the output processing.

Moreover, in an environment where a power saving processing is absolutely required as in the case of a mobile terminal, context switching also becomes a large factor causing an increase of electricity consumption.

The second problem is that the solution largely depends on platforms or applications of each of the OSs.

In order to realize such inputs and outputs between the GUI servers, both of the GUI servers of the host OS and each guest OS need to support functions for the inputs and outputs therebetween.

Moreover, particularly in a case where environments, in each of which a GUI server operates, are significantly different from one another, communications between the GUI servers require conversion of data in the application level.

The third problem is a security risk associated with the fact that all of the inputs and outputs processing are handled by the GUI servers.

Since a GUI server is an "unprivileged process (user authorization)", its tamper resistance is weak in comparison with an OS which is a "privileged process (kernel authorization)".

In a case where the GUI server is tampered with, the input and output of the OS may be inappropriately processed. This may causes an event in which an input result is passed to a wrong input destination, or in which an output result of the OS which is not supposed to be displayed is displayed.

Furthermore, in the switching of an OS occupying the HID to another, for the purpose of improving usability, various switching patterns need to be considered.

Moreover, as to each of the switching patterns, it is necessary to consider provision of switching methods, prevention of an unauthorized switching and an unauthorized occupation of the HID and the like.

The following cases are conceivable as examples of the switching patterns.

In the case where a specific program is started on a specific OS;

In the case where a switching button provided to a keyboard or the like is pressed;

In the case where an abnormality occurs on the OS which occupies the HID; and

In the case where a specific program is forcibly started from the outside of the computer for the purpose of debugging or the like.

Moreover, the following matters are conceivable as examples of matters to be considered at the time of switching OSs.

Prevention of an unauthorized occupation of the HID by a specific OS or a specific program;

Prevention of repeated switching which may reduce usability; and

Prevention of switching in a case where a program with a high priority is used.

<Patent document 1> US 2004/0205755

<Non-Patent document 1> "Xen and the Art of Virtualization" In Proc. of Symposium on operating systems Principles (SOSP) 2003 (www dot C1 dot cam dot ac dot uk slash Re Search slash SRG slash netos slash papers slash 2003-xensosp dot pdf)

<Non-patent document 2> "A 600MIPS 120 mW 70 µA Leakage Triple-CPU Mobile Application Processor Chip" In Proc. of IEEE International Solid-State Circuits Conference (ISSCC) 2005

BRIEF SUMMARY OF THE INVENTION

The present invention has been made in view of the above points. An object of the present invention is therefore to provide an input/output control apparatus, an input/output control system and an input/output control method, designed in consideration of efficiency, non-dependency of higher layer platforms, and usability.

A first aspect of the present invention is summarized as an input/output control apparatus configured to control an input of an input device and an output of an output device provided to a computer on which at least two operating systems operate simultaneously on a host system including a function of simultaneously running a plurality of operating systems, the device including: a request acceptance unit configured to accept a switch request for requesting to change an operating system occupying any one of the input device and the output device; a control information generator unit configured to generate control information including any one of input destination information and output enable information in response to the switch request; and a control information output unit configured to output any one of the input destination information and the output enable information; wherein the input destination information includes at least information for specifying an input destination operating system to which information inputted from the input device is inputted; and the output enable information includes at least information for specifying whether or not each of the plurality of operating systems can output information to the output device.

In the first aspect of the present invention, the request acceptance unit can be configured to accept the switch request from first control software which controls a first input device which has previously been provided to the computer.

In the first aspect of the present invention, the request acceptance unit can be configured to accept the switch request from each of the plurality of operating systems.

In the first aspect of the present invention, the request acceptance unit can be configured to accept or reject the switch request in accordance with a request rule which regulates processing for the switch request, when the request rule is provided.

In the first aspect of the present invention, the request rule can request an input of confidential information for accepting the switch request, and the request acceptance unit can be configured to accept the switch request only when the inputted confidential information is correct.

In the first aspect of the present invention, the request rule can define an invalid switch request, and the request acceptance unit can be configured to reject the switch request, when the switch request is invalid.

In the first aspect of the present invention, the request rule can require a user's judgment on whether or not to permit the acceptance of the switch request, the judgment being inputted by the user in a specific operation, and the request acceptance unit can be configured to accept the switch request in accordance with the permission by the specific operation.

In the first aspect of the present invention, the request acceptance unit can be configured to accept the switch request, when any user's judgment on whether or not to permit the acceptance is not obtained from the user for a certain period of time.

In the first aspect of the present invention, the request rule can define a specific switch request as a privileged request; and after generating the control information in accordance with the privileged request, until a specific condition is fulfilled, the request acceptance unit can be configured to reject a switch request for any one of the input device and the output device which a specific operating system occupies in accordance with the privileged request.

In the first aspect of the present invention, the request acceptance unit can be configured to accept the switch request from the host system.

In the first aspect of the present invention, when a first operating system or the host system on the computer includes a state change detection function which detects a specific state change of an operating system operating on the computer, the request acceptance unit can be configured to accept the switch request issued by the state change detection function in accordance with the state change of a second operating system which occupies any one of the input device and the output device.

A second aspect of the present invention is summarized as an input/output control system including at least one input device, at least one output device, an input/output control apparatus which controls an input of the input device and an output of the output device, and a host system including a function of simultaneously running a plurality of operating systems and a communications function between the plurality of operating systems, wherein the input/output control apparatus includes: a request acceptance unit configured to accept a switch request for requesting to change an operating system occupying any one of the input device and the output device; a control information generator unit configured to generate control information including any one of input destination information and output enable information in response to the switch request; and a control information output unit configured to output any one of the input destination information and the output enable information; one specific operating system among the plurality of operating systems which operate on the host system includes: an input device controller configured to specify, by using the outputted input destination information, an input destination operating system to which information inputted from the input device is inputted, and to input the inputted information to the input destination operating system; and an output device controller configured to specify, by using the outputted output enable information, an operating system capable of outputting information to the output device, and to output the information received from the operating system to the output device; the input destination information includes at least information for specifying the input destination operating system to which information inputted from the input device is inputted; and the output enable information includes at least information for specifying whether or not each of the plurality of operating systems can output information to the output device.

A third aspect of the present invention is summarized as an input/output control system including at least one input device, at least one output device, an input/output control apparatus which controls an input of the input device and an output of the output device, and a host system including a function of simultaneously running a plurality of operating systems and a communications function between the plurality of operating systems; wherein the input/output control apparatus includes: a request acceptance unit configured to accept a switch request for requesting to change an operating system occupying any one of the input device and the output device; a control information generator configured to generate control information including any one of input destination information and output enable information in response to the switch request; and a control information output unit configured to output the input destination information and the output enable information; and each of the plurality of operating systems which operate on the host system includes: an input device controller unit configured to determine whether or not to input, to the operating system, information inputted from the input device, by referring to the input destination information outputted from the input/output control apparatus; and an output device controller unit configured to determine whether or not to output information outputted from the operating system to the output device, by referring to the output enable information outputted from the input/output control apparatus.

A fourth aspect of the present invention is summarized as an input/output control system including at least one input device, at least one output device, an input/output control apparatus which controls an input of the input device and an output of the output device, and a host system including a function of simultaneously running a plurality of operating systems and a communications function between the plurality of operating systems; wherein the input/output control apparatus includes: a request acceptance unit configured to accept a switch request for requesting to change an operating system occupying any one of the input device and the output device; a control information generator unit configured to generate control information including any one of input destination information and output enable information in response to the switch request; and a control information output unit configured to output any one of the input destination information and the output enable information; each of the plurality of operating systems includes: an input device controller unit configured to control the input device; and an output device controller unit configured to control the output device; and the host system includes an input and output controller unit configured to enable or disable the input device controller unit of the operating system on the basis of the input destination information outputted from the input/output control apparatus, and to enable or disable the output device controller unit of the operating system on the basis of the output enable information outputted from the input/output control apparatus.

A fifth aspect of the present invention is summarized as an input/output control system including at least one input device, at least one output device, an input/output control apparatus which controls an input of the input device and an output of the output device, and a host system including a function of simultaneously running a plurality of operating systems and a communications function between the plurality of operating systems; wherein the input/output control apparatus includes: a request acceptance unit configured to accept a switch request for requesting to change an operating system occupying any one of the input device and the output device; a control information generator unit configured to generate control information including any one of input destination information and output enable information in response to the switch request; and a control information output unit configured to output any one of the input destination information and the output enable information; the host system includes an interrupt notification unit configured to notify the operating system of an interrupt for the input device when the interrupt occurs; and the interrupt notification unit is configured to specify a notification destination to which the interrupt is notified, in accordance with the input destination information outputted from the input/output control apparatus.

A sixth aspect of the present invention is summarized as an input/output control system including at least one input device, at least one output device, an input/output control apparatus which controls an input of the input device and an output of the output device, and a host system including a function of simultaneously running a plurality of operating systems and a communications function between the plurality of operating systems; wherein the input/output control apparatus includes: a request acceptance unit configured to accept a switch request for requesting to change an operating system occupying any one of the input device and the output device; a control information generator unit configured to generate control information including any one of input destination information and output enable information in response to the switch request; and a control information output unit configured to output any one of the input destination information and the output enable information; and the host system includes a QoS controller unit configured to perform QoS control for the operating system, in accordance with any one of the input destination information and the output enable information which are outputted from the input/output control apparatus.

A seventh aspect of the present invention is summarized as an input/output control method of controlling an input of an input device and an output of an output device provided to a computer on which at least two operating systems operate simultaneously on a host system including a function of simultaneously running a plurality of operating systems, the method including: accepting a switch request for requesting to change an operating system occupying any one of the input device and the output device; generating control information including any one of input destination information and output enable information in response to the switch request; and outputting the input destination information and the output enable information; wherein the input destination information includes at least information for specifying an input destination operating system to which information inputted from the input device is inputted; and the output enable information includes at least information for specifying whether or not each of the plurality of operating systems can output information to the output device.

In the second aspect of the present invention, a first operating system other than the specific operating system can include a virtual input device controller unit and a virtual output device controller unit; the virtual input device controller unit can be configured to receive information inputted from the input device controller unit of the specific operating system, and to input the inputted information to a program which operates on the first operating system; the virtual output device controller unit can be configured to makes a judgment, on the basis of the output enable information, on whether or not the first operating system can output information, outputted from the program which operates on the first operating system, to the output device; and only when it is judged that the first operating system can output the information to the output device, the first operating system can be configured to output the information to the output device controller unit of the specific operating system.

A eighth aspect of the present invention is summarized as an input/output control system including at least one input device, at least one output device, an input/output control apparatus which controls an input of the input device and an output of the output device, and a host system including a function of simultaneously running a plurality of operating systems; wherein the input/output control apparatus includes: a request acceptance unit configured to accept a switch request for requesting to change an operating system occupying any one of the input device and the output device; a control information generator unit configured to generate control information including any one of input destination information and output enable information in response to the switch request; and a control information output unit configured to output any one of the input destination information and the output enable information; a program, which operates on the operating system, is configured to issue a system call requesting an input to the operating system, only when the operating system, on which the program operates, is an input destination operating system from the input device according to the input destination information; the program is configured to issue a system call requesting the operating system to output information, only when an operating system, on which the program operates, is capable of outputting information to the output device according to the output enable information; the input destination information includes at least information for specifying the input destination information operating system for input information from the input device; and the output enable information includes at least information for specifying whether or not each of the plurality of operating systems can output information to the output device.

In the first aspect of the present invention, the operating system can be configured to issue the switch request, only when the request rule allows the operating system to issue the switch request.

In the first aspect of the present invention, the host system can be configured to issue the switch request, only when the request rule allows the host system to issue the switch request.

A ninth aspect of the present invention is summarized as an input/output control system including at least one input device, at least one output device, an input/output control apparatus which controls an input of the input device and an output of the output device, and a host system including a function of simultaneously running a plurality of operating systems; wherein the input/output control apparatus includes: a request acceptance unit configured to accept a switch request for requesting to change an operating system occupying any one of the input device and the output device; a control information generator unit configured to generate control information including any one of input destination information and output enable information in response to the switch request; and a control information output unit configured to output any one of the input destination information and the output enable information; a program, which operates on the operating system, is configured to request the operating system to issue the switch request to the input/output control apparatus; the input destination information includes at least information for specifying an input destination operating system to which information inputted from the input device is inputted; and the output enable information includes at least information for specifying whether or not each of the plurality of operating systems can output information to the output device.

In the ninth aspect of the present invention, the program can be configured to request the operating system to issue the switch request to the input/output control apparatus, only when the request rules allows the switch request to be issued.

BRIEF DESCRIPTION OF THE SEVERAL VIEWS OF THE DRAWINGS

FIG. 1 is a block diagram of a configuration of an input/output control system according to a first embodiment of the present invention.

FIG. 2 is a flowchart showing an input/output control method according to the first embodiment of the present invention.

FIG. 3 is a block diagram of a configuration of an input/output control system according to a second embodiment of the present invention.

FIG. 4 is a block diagram of a configuration of the input/output control system according to the second embodiment of the present invention.

FIG. 5 is a block diagram of a configuration of an input/output control system according to a third embodiment of the present invention.

FIG. 6 is a block diagram of a configuration of the input/output control system according to the third embodiment of the present invention.

FIG. 7 is a block diagram of a configuration of the input/output control system according to the third embodiment of the present invention.

FIG. 8 is a block diagram of a configuration of the input/output control system according to the third embodiment of the present invention.

FIG. 9 is a block diagram of a configuration of the input/output control system according to the third embodiment of the present invention.

FIG. 10 is a block diagram of a configuration of an input/output control system according to a fourth embodiment of the present invention.

FIG. 11 is a block diagram of a configuration of an input/output control system according to a fifth embodiment of the present invention.

DETAILED DESCRIPTION OF THE INVENTION

Figure 12:
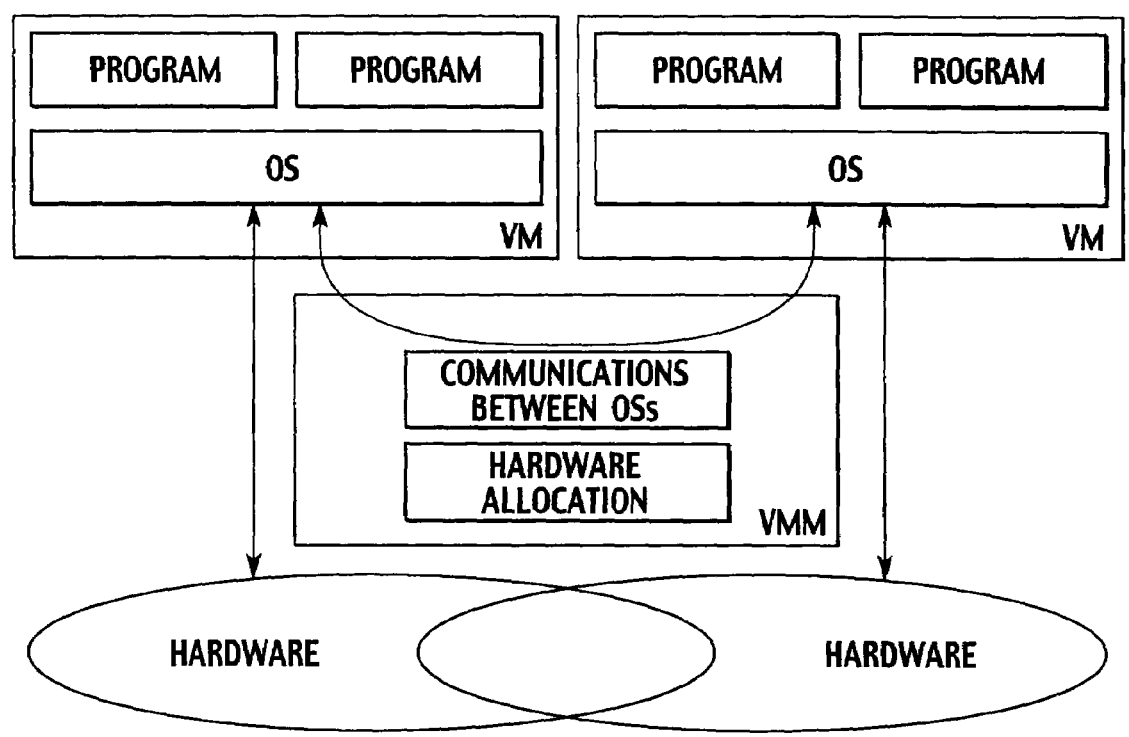
FIG. 12 is a block diagram of a configuration of a conventional input/output control system.
Figure 13:
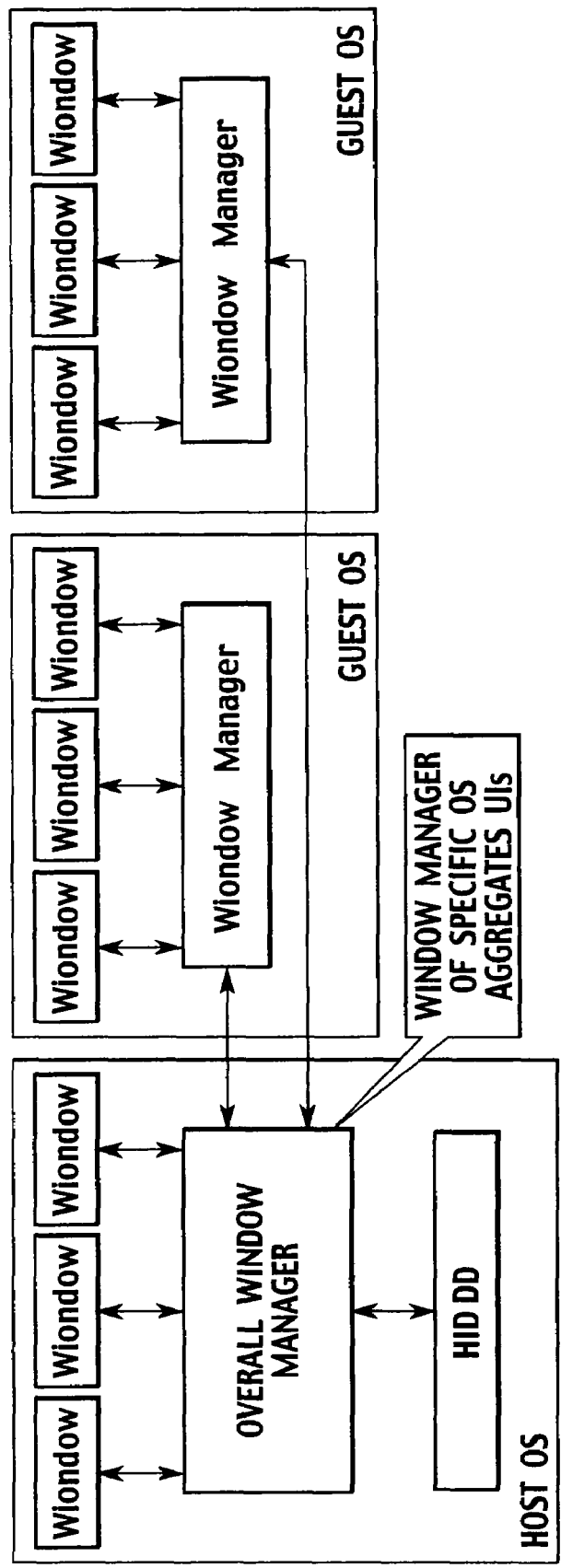
FIG. 13 is a block diagram of a configuration of a conventional input/output control system.

Hereinafter, descriptions of embodiments of the present invention will be given with reference to the drawings. In the descriptions of the drawings below, identical or like reference numerals are provided to the identical or like components. It is to be noted that the drawings are only schematic representations of the embodiments of the invention.

First Embodiment (Input/Output Control System)

FIG. 1 shows a system configuration of an input/output control apparatus according to a first embodiment of the present invention.

For example, in a case where multiple OSs operate on a VMM, and a specific OS among the multiple OSs occupies and uses a specific device at an arbitrary time, the input/output control apparatus 100 performs the processing of making a judgment on which OS occupies the specific device, of switching the OSs, or the like.

As the aforementioned specific device, HIDs typified by a keyboard as an input device, or a display device as an output device can be cited as typical examples.

For example, suppose that a user intends to use a program, which operates on another OS, and then presses a switching button previously provided to a computer.

The input/output control apparatus 100 detects that the switching button has been pressed, and then generates control information in order for the OS, on which the program operates, to occupy input/output devices.

Specifically, the input/output control apparatus 100 outputs input destination information 230, which specifies an input destination OS to which information inputted from an input device is inputted.

The input/output control apparatus 100 also outputs output enable information 240, which specifies an OS capable of outputting output information to an output device (i.e., which specifies whether or not each of multiple OSs can output information to an output device).

As shown in FIG. 1, the input/output control apparatus 100 includes a request acceptance unit 110, a control information generator unit 120, and a control information output unit 130. Hereinafter, processing performed by each of the components will be described.

The request acceptance unit 110 is configured to perform processing as follows, in a case where a switch request 210 is issued from a specific request source, the switch request 210 requesting to change an OS occupying any one of the input/output devices (i.e., to switch an OS occupying any one of the input/output devices to another).

(1. Detection of Switch Request 210)

The request acceptance unit 110 detects the switch request 210 issued from a specific request source.

As a trigger for the switch request 210 to be issued, an external input 211, an OS process 212, a VMM process 213, or an OS state change 214 can be cited as an example.

For example, in a case where a user presses a switching button previously provided to a computer, a switch request 210 triggered by the "external input 211" occurs as a hardware interrupt.

In a case where a hardware interrupt occurs, a control by a device driver which controls the switching button begins according to the operation of the conventional VMM described in the chapter "Interrupt and Event Handling", beginning from the paragraph "0138" of the Patent document 1. Accordingly, the switch request 210 is issued by the device driver.

Moreover, for example, in a case where an OS which does not occupy the input/output devices at that time, or a program operating on the OS requests the occupation of the input/output devices, the OS issues the switch request 210 triggered by the "OS process 212".

When the VMM detects an event between OSs or the like which is a lower layer process than that of the OS, a switch request 210 triggered by the "VMM process 213" is issued for switching an OS which occupies the input/output devices to another as appropriate.

For example, the VMM issues the switch request 210 when executing an OS debugging function of the VMM, the function being described in the chapter "Debugging" beginning from the paragraph "0159" of Patent document 1.

A switch request 210 triggered by the "OS state change 214" is generated, in a case where a specific state change occurs in an OS which occupies the input/output devices.

Specifically, in a case where the OS, another OS, the VMM, or the like is provided with a state change detection function, the state change detection function issues the switch request 210.

As an example of such a state change, a restart of an OS, or a freeze of an OS can be conceivable.

Furthermore, an example of the state change detection function is described in the chapter "Hot Reboot of Secondary Operating System" beginning from the paragraph "0122" of the Patent document 1.

Specifically, how the switch request 210 issued by the programs, the OSs, the VMM or the like is notified to the request acceptance unit 110 is dependent on a method of arranging device drivers, the input/output control apparatus 100 or the like.

As to the details thereof, although descriptions will be given in second to fourth embodiments of the present invention, at least, the switch request 210 includes information with which the request source can be specified, and the request content (for example, the request is for which OS to occupy the input/output devices, the request is for which input/output devices to be occupied, or the like).

(2. Acceptance/Rejection of Switch Request 210)

The request acceptance unit 110 cannot accept all the switch requests 210 which have been detected.

For example, in a case where a malicious program issues the switch requests 210 successively, and the request acceptance unit 110 accepts all the switch requests 210, there is a possibility where usability is significantly lowered since the switching of screens occurs many times, or the input/output devices are occupied by a specific OS for a long period of time.

In a case where a request rule 250 for making a judgment on whether or not to accept the detected switch request 210 is given to the request acceptance unit 110, the request acceptance unit 110 makes an acceptance judgment for the switch request 210 in accordance with the request rule 250.

An example of the request rule 250 is shown in Table 1.

As in the example shown in Table 1, it is assumed that a general OS with a low reliability and a secure OS with a high reliability operate, and only general programs operate on the general OS, and general programs as well as privileged programs operate on the secure OS.

The differences between the secure OS and the general OS are that a solid security is ensured in the secure OS, and that the programs, which operate on the general OS, or the general OS itself may have a problem or a malicious intent.

TABLE 1

| REQUEST SOURCE | PROGRAM | SWITCHING DESTINATION | ACCEPTANCE CONDITION |
|---|---|---|---|
| VMM | | Any | WITHOUT ANY CONDITION (PRIVILEGED REQUEST) |
| SECURE OS | PRIVILEGED PROGRAM | SECURE OS | WITHOUT ANY CONDITION (PRIVILEGED REQUEST) |
| | GENERAL PROGRAM | SECURE OS | IN THE CASE WHERE USER ALLOWS, OR THERE IS ANY RESPONSE FROM USER |
| GENERAL OS | GENERAL PROGRAM | GENERAL OS | IN THE CASE WHERE USER ALLOWS, AND IT IS NOT INVALID REQUEST |
| SWITCHING BUTTON DEVICE DRIVE | | SECURE OS | IN THE CASE WHERE PASSWORD OF USER IS CORRECT |
| | | GENERAL OS | WITHOUT ANY CONDITION |

The request acceptance unit 110 is configured to accept a switch request 210 from the VMM without any condition.

This is because a switch request 210 from the VMM is a critical request, which is issued due to the starting of the debugging function or the like described above.

Furthermore, this is because an assumption can be made that the VMM does not include any bug or vulnerability as in the case of the secure OS.

Likewise, the request acceptance unit 110 is configured to accept a switch request 210, which is issued from a privileged program of the secure OS, without any condition.

As the privileged program, for example, a program, which starts when the state of the system changes, is assumed.

Specifically, as an example of the privileged program, a program which notifies the user of a hardware failure, a program which notifies the user of a decrease in the remaining battery, a program which notifies the user of detection of virus, or the like can be cited.

As to the secure OS itself, security is guaranteed. Moreover, the secure OS is designed to avoid the lowering of usability due to unnecessary switching as much as possible.

Accordingly, the request acceptance unit 110 is configured to accept the switch request 210 issued by the programs to notify such important information, without any condition.

The request acceptance unit 110 is configured to accept a switch request 210 issued by general programs of the secure OS, only in a case where the acceptance is allowed by the user.

For example, consider a case where a mailer program on the secure OS receives a mail, and then a switch request 210 is issued to notify the user of the receipt of the mail.

At this time, the user is using a specific program on the general OS, and may be hoping to avoid the interruption of the use of the specific program, the interruption being caused by the switching of the OSs.

To this end, the request acceptance unit 110 holds the acceptance of the received switch request 210 once, and issues a notification to the user, the notification causing the user to make a judgment on whether or not to switch the OS to another.

Specifically, the request acceptance unit 110 causes a user acceptance program, which asks for user acceptance, and which exists on the OS, to be started, and the user acceptance program asks the user the aforementioned judgment.

In such communications with the specific OS, for example, a communications function between OSs described in "Interoperating System Communications-Virtual Bus" beginning from the paragraph "0149" of the Patent document 1 is used.

In a case where the user accepts the switching of the OS to another, the request acceptance unit 110 accepts the switch request 210, which has been on hold.

In a case where the user reject (or does not accept) the switching of the OS, the request acceptance unit 110 rejects (or does not accept) the switch request 210, which has been on hold.

Here, consider a case where there is no response from the user as to whether or not to accept the switching of the OS to another.

For example, a case where the user acceptance program, which operates on the general OS does not operate normally due to a failure, or the like is conceivable.

In order to support such a case, the request acceptance unit 110 may be configured to accept a switch request 210, in a case where the switch request 210 is on hold for a certain period of time. Thereby, it is possible to prevent a case where switch requests 210 being on hold remain accumulated.

As to a switch request 210 issued by a general program of the general OS, the request acceptance unit 110 basically makes the same judgment as that of the switch request issued by a general program of the secure OS.

Specifically, the request acceptance unit 110 is configured to accept the switch request 210, in the case where the switching of the OS to another is accepted by the user.

The request acceptance unit 110 is, however, configured to reject (or not to accept) a switch request 210, even in the case where the switch request 210 is on hold for the certain period of time unless the user accepts the switching of the OS to another.

The user acceptance program on the secure OS does not freeze due to a failure or the like. Accordingly, as long as the user is using the computer, the switch request 210 does not become the state of being on hold, basically.

Furthermore, as a general program operating on the general OS, a program, which has been downloaded from an arbitrary website by the user, is also assumed to be one.

In this case, it is conceivable that such a program may have a failure or a malicious intent, and issue an invalid switch request 210.

For example, a case where the program successively issues switch requests 210, or the program issues a switch request 210 even though it is not necessary for the program to occupy input/output devices, is assumed.

Although it is possible for the user to refuse the acceptance of the switching of the OS to another by the user acceptance program, if the user makes a judgment on whether or not to accept the switching of the OS every time, it leads to the lowering of usability.

In order to prevent the invalid switch request 210 described above, the request switch acceptance unit 110 may be configured to automatically not accept a switch request 210 which coincides with a condition set by the user or the like in advance, the condition for regarding a switch request 210 as invalid.

The request acceptance unit 110 may be configured to automatically reject a switch request 210 issued by a program, which issues a switch request 210 equal to or more than certain times within a certain time period, for example.

Furthermore, a condition for rejecting a switch request 210 issued by a certain program may be generated by allowing the user to set whether or not to always reject the switch request 210 issued by the program when installing the program.

In this case, by the designation by the user during the installation of the program, the general OS can rewrite, by use of a communications function between OSs or the like, the request rule 250 to indicate not to accept the switch request 210 from the program.

Since a switch request 210 issued by the switching button is a switch request 210 by a user's intention, the request acceptance unit 110 is configured to accept the switch request 210, basically.

However, there is a possibility where a privileged program related to fundamentals of the system is started by a program on the secure OS, which is arbitrarily started by a third party.

Accordingly, when switching to the secure OS, the user is prompted to input a password (security information). Thereby, only an authorized user of this computer can perform the switching to the secure OS.

Moreover, a method of calling or handling the program, which prompts an input of a password, is assumed to be the same as that of the user acceptance program.

Furthermore, there is a case where the request rule 250 regulates input/output devices separately from a rule specified by the request source as in the manner described above.

For example, normally, a keyboard as a standard input and a display device as a standard output are generally used by a program at the same time.

Accordingly, in a case where occupation of only the keyboard is requested, the request rule 250 may determine not to accept the switch request 210.

Thereby, it is possible to avoid a deadlock situation in which a specific program requests the occupation of the display device while the program occupies the keyboard, and at the same time, another program requests the occupation of the keyboard while the program occupies the display device.

Furthermore, the request rule 250 may handle a switch request 210 issued by the VMM or a privileged program of the secure OS as a privileged request.

The privileged request is a switch request which rules, without any condition, not to accept a switch request 210 for another OS to occupy input/output devices until a specific condition is fulfilled, in a case where the input/output devices are occupied by a specific OS according to the privileged request.

For example, suppose a case where a virus detection software program, which is a privileged program of the secure OS, occupies the input/output devices. In this case, until the privileged program releases the input/output devices explicitly, a switch request 210 issued by a general program for occupying the input/output devices is not accepted without any condition.

It should be noted that the notification of the explicit release is realized in the same scheme as that of the notification of the switch request 210 such as a communications function between OSs.

Moreover, it is possible for the aforementioned VMM, OSs or programs to make a judgment on whether or not to issue a switch request 210 by referring to the request rule 250 in advance. As a result of this, it is possible to restrict the issuance of an unnecessary switch request 210.

The issuance of a switch request 210 causes the switching between OSs including the OS, on which the input/output control apparatus 100 operates, or the VMM.

Accordingly, in the manner described above, since a judgment on whether or not to accept a switch request 210 is made in advance before the switch request 210 is issued, it is possible to reduce the unnecessary switching between OSs and processing overhead.

It is, however, conceivable that the aforementioned general programs issue a switch request 210 even though they are aware that the switch request 210 is not accepted.

Accordingly, there is a case where it is necessary for the request acceptance unit 110 to recheck the request rule 250 depending on the source of the issuance of the switch request 210.

(3. Notification of Switch Request 210)

The request acceptance unit 110 is configured to notify the control information generator unit 120 of an accepted switch request 210.

The control information generator unit 120 is configured to generate control information 121 according to the switch request 210 accepted by the request acceptance unit 110.

Here, the control information 121 is status information, which regulates which OS to occupy the input/output devices at the time.

The control information generator unit 121 includes at least an input/output device list 220 as an input.

For example, as shown in Table 2, the control information 121 regulates which OS to occupy all the devices specified by the input/output device list 220 at the time.

The switch request 210 designates at least input/output devices to be updated in the control information, and an OS, which occupies the input/output devices.

Accordingly, it is possible for the control information generator unit 120 to generate the control information 121 according to the switch request 210.

Here, a mask state indicates a state where a switch request 210, which changes the control information 121, is not accepted without any condition due to the issuance of a privileged request.

TABLE 2

| TYPE OF CONTROL INFORMATION | INPUT/OUTPUT DEVICE | OCCUPYING OS | MASK STATE |
|---|---|---|---|
| INPUT DESTINATION INFORMATION | KEYBOARD | SECURE OS | MASK |
| INPUT DESTINATION INFORMATION | MOUSE | SECURE OS | MASK |
| OUTPUT ENABLE INFORMATION | DISPLAY DEVICE | SECURE OS | MASK |
| OUTPUT ENABLE INFORMATION | SPEAKER | GENERAL OS | |

The control information output unit 130 is configured to output the generated control information 121.

Specifically, the control information output unit 130 outputs, to the appropriate component, the input destination information 230 for specifying an input destination OS to which information inputted from the input device is inputted, and the output enable information 240 for specifying whether or not each of multiple OSs can output information to the output destination.

As an output destination, a device driver, the VMM, a program for a GUI server such as a window manager or the like is assumed.

It should be noted that descriptions of an operation of the control information output unit 130 will be provided later.

(Input/Output Control Method)

Descriptions of an input/output control method according to the first embodiment of the present invention will be provided by referring to FIG. 2.

Specifically, descriptions will be given of a method of controlling inputs of an input device or outputs of an output device provided to a computer, on which at least two or more OSs operate simultaneously, on a host system provided with a function of simultaneously running multiple OSs.

As shown in FIG. 2, in step S101, the input/output control apparatus 100 accepts a switch request 210 requesting switching of an operating system occupying an input device or an output device to another.

Here, the input/output control apparatus 100 may accept a switch request from a first control software program (device driver), which controls a first input device previously provided with the computer, or may accept a switch request 210 from an OS. Furthermore, the input/output control apparatus 100 may also accept a switch request 210 from the host system.

Moreover, in step S101, in a case where a request rule 250, which regulates processing for the switch request 210, is provided, the input/output control apparatus 100 determines whether or not to accept the switch request 210 on the basis of the request rule 250.

Furthermore, in a case where an input of confidential information (password) is requested by the request rule 250 when accepting the switch request 210, in step S101, the input/output control apparatus 100 accepts the switch request 210 only when the inputted confidential information is correct.

Alternately, in a case where an invalid switch request is defined by the request rule 250, in step S101, when the detected switch request 210 is invalid, the input/output control apparatus 100 rejects the switch request 210.

Here, as an "invalid switch request", switch requests 210, which are successively issued within a certain period of time, a switch request 210 issued by an OS being not allowed to issue a switch request 210, or the like can be cited as an example.

Moreover, in a case where a judgment of permission or no-permission of the user by a specific operation from the user is required by the request rule 250 when accepting a switch request 210, in step S101, the input/output control apparatus 100 accepts the switch request 210 upon permission by the specific operation.

Furthermore, in a case where any judgment as to permission or no-permission by the specific operation is not obtained within a certain period of time, in step S101, the input/output control apparatus 100 accepts the switch request 210.

Moreover, in a case where a specific switch request 210 is considered to be a "privileged request" by the request rule 250, in step S101, after generating control information corresponding to the privileged request, the input/output control apparatus 100 does not accept the switch request 210 for the input device or the output device occupied by a specific OS by the privileged request until a specific condition is fulfilled.

Here, as a "specific condition", a case where the processing of a program, which has issued the privileged request, ends can be cited as an example.

Moreover, in a case where a first or the host system OS on the computer is provided with the state change detection function, which detects a specific state change of an OS operating on the computer, in step S101, the input/output control apparatus 100 may accept a switch request 210 issued by the state change detection function in accordance with the state change of a second OS which occupies the input device or the output device.

Here, as described above, a change to the state where a normal operation of the second OS becomes impossible due to the freezing or the end thereof, or the like can be cited as an example of a "state change".

In step S102, in accordance with the switch request 210, the input/output control apparatus 100 outputs input information 230 including at least information for specifying the input destination OS to which information inputted from the input device is imputed.

Alternately, in step S102, the input/output control apparatus 100 generates output enable information 240 including at least information for specifying whether or not an OS can output information to the output device.

In step S103, the input/output control apparatus 100 outputs the input destination information 203 and the output enable information 240 to appropriate components. The output destination is a device driver, the VMM, or a GUI server program, which is a window manager or the like.

(Operation and Effect)

According to the present embodiment, an OS, which occupies the input/output devices, can be sequentially switched to another, by sequentially generating control information 121 for switch requests 210 generated by various factors.

As a result of this, as to inputs and outputs, which occur at arbitrary timings, it becomes possible to input inputted information to an appropriate OS, and to output, to the output device, a piece of output information only from an appropriate OS among pieces of output information.

Furthermore, it is possible to improve performance by reducing context switching since inputs and outputs from OSs other than the OS, which occupies the device, are not processed after switching an OS to another.

Furthermore, there is an advantage that the system is not to be dependent on higher layer applications, since only the switching of interfaces between the input/output devices and the OSs is performed.

Moreover, according to the present embodiment, the request acceptance unit 110 of the input/output control apparatus 100 is configured to accept a switch request 210 from the first control software (device driver), which controls the first input device previously provided to the computer.

Accordingly, it is possible to generate the control information 121 by the input from the input device being provided to the computer.

As a result of this, in the simplest example, it is possible to perform the switching of an OS to another on a computer provided with a special switching button when a user presses the switching button. Here, a specific button on a keyboard may be assigned as the switching button and be used.

Moreover, according to the present embodiment, since the request acceptance unit 110 of the input/output control apparatus 100 is configured to accept a switch request 210 from an OS, it is possible to generate control information 121 in accordance with the specific processing of the OS.

As a result of this, in a case where a specific GUI application is started on the OS, for example, it is possible to move the controlling of the HID to the specific GUI application.

Moreover, according to the present embodiment, in a case where a request rule 250, which regulates processing for the switch request 210, is provided to the request acceptance unit 110 of the input/output control apparatus 100, since the request acceptance unit 110 is configured to make a judgment on whether or not to accept the switch request 210 on the basis of the request rule 250, it is possible to prevent threat, namely, decrease in usability or security risk caused by accepting all the switch requests 210, which are generated by various factors.

Moreover, according to the present embodiment, in the input/output control apparatus 100, a request rule 250 requests the input of confidential information (password) for accepting a switch request 210, and the request acceptance unit 110 is configured to accept the switch request 210 only when the inputted confidential information is correct. Accordingly, it is possible to restrict the switching to a specific OS by use of a password or the like.

For example, in a case where a secure OS capable of setting the basic setting of the computer is prepared, it is possible to restrict the switching to the secure OS by a third party, by use of the password, which is set in advance by the user of the computer.

Moreover, according to the present embodiment, in the input/output control apparatus 100, the request rule 250 defines an invalid switch request, and the request acceptance unit 110 is configured not to accept a switch request 210 in a case where the switch request 210 is determined to be invalid. Accordingly, it is possible to restrict the invalid switch request 210.

In particular, by restricting an invalid switch request 210 issued by a false operation or a malicious operation of an invalid OS, it is possible to prevent decrease in usability, which is attributable to the occupation of a device by a specific OS, or the repeated switching of an OS to another.

Moreover, according to the present embodiment, in the input/output control apparatus 100, the request rule 250 requires, for acceptance of the switch request 210, a judgment of permission or no-permission of the user by a specific operation performed by the user, and the request acceptance unit 110 is configured to accept the switch request 210 in accordance with permission by the specific operation.

Accordingly, it is possible to perform the switching of an OS to another in accordance with the judgment of permission or no-permission of the user.

As a result of this, it is possible to prevent decrease in usability, which is attributable to the switching of an OS to another without any notice while a specific application is being used by the user.

Here, in a case where any judgment of permission or no-permission is not obtained from the user, there is a possibility where some kind of malfunction occurs on part of the program asking the user permission or no-permission.

For example, there is a possibility where the GUI application is freezing, or is not intentionally asking the user a judgment of permission or no-permission for the purpose of the occupation of the device.

Accordingly, according to the present embodiment, in the input/output device 100, the request acceptance unit 110 is configured to accept the switch request 210, in a case where any judgment of permission or no-permission by the specific operation is not obtained from the user for a certain period of time. That is, the request acceptance unit 110 is configured to be provided with a timeout function for a response of the permission or no-permission. Accordingly, it is possible to prevent the occurrence of the aforementioned problem.

Moreover, according to the present embodiment, in the input/output control apparatus 100, the request rule 250 defines a specific switch request 210 as a privileged request, and the request acceptance unit 110 is configured not to accept the switch request 210 for the input device or the output device, which is occupied by the specific OS by the privileged request, until a specific condition is fulfilled after generating the control information 121 by the privileged request.

Accordingly, by regarding the specific switch request 210 as the privileged request, the input/output devices can be assigned with the highest priority in accordance with the privileged request.

Such a privileged request occurs when a program is started, which may be forcibly started due to a security check, a debugging check, or the like for a terminal device.

It should be noted that such a privileged request is prioritized over a general switch request 210, which occurs thereafter.

Accordingly, until the processing of the privileged request ends, the input/output devices are not released from the occupation.

Moreover, according to the present embodiment, since the request acceptance unit 110 of the input/output control apparatus 100 is configured to accept a switch request 210 from the host system, the switch request 210 issued by the VMM or the like of the host system can be accepted.

As a result of this, it is possible to generate the control information 121 attributable to the processing of a layer lower than each of OSs controlled by the VMM.

Moreover, according to the present embodiment, in a case where the first OS or the host system on the computer is provided with the state change detection function, which detects a specific state change of an OS operating on the computer in the input/output control apparatus 100, the request acceptance unit 110 is configured to accept a switch request 210 issued in accordance with a state change, which is detected by the state change detection function, of the second OS which occupies the input device or the output device.

Accordingly, in a case where an OS or the VMM detects the state change of a specific OS, it is possible to generate control information 121 due to the state change.

As an example of such a state change, the end or freezing of an OS is conceivable. As to the state change detection mechanism itself, descriptions are provided in detail in the Patent document 1.

As a result of this, it is possible to prevent the input/output devices to be occupied by an OS, which is not performing correct operations.

Moreover, according to the present embodiment, prior to the issuance of a switch request 210, an OS is configured to read the request rule 250, and only in a case where the switch request 210 is to be accepted by the request acceptance unit 110 of the input/output control apparatus 100, the OS is configured to issue the switch request 210.

Accordingly, it is possible to reduce the processing cost of the switching between OSs relating to the switch request 210, as well as the processing cost of the OS or of the host system such as the VMM, on which the input/output control apparatus 100 operates.

Furthermore, according to the present embodiment, prior to the issuance of a switch request 210, the host system is configured to read the request rule 250, and only in a case where the switch request 210 is to be accepted by the request acceptance unit 110 of the input/output control apparatus 100, the host system is configured to issue the switch request 210.

Accordingly, it is possible to reduce the processing cost of the switching between OSs relating to the switch request 210, as well as the processing cost of the OS or of the host system such as the VMM, on which the input/output control apparatus 100 operates.

Moreover, according to the present embodiment, prior to the issuance of a switch request 210, a program, which operates on an OS not occupying the input/output devices, is configured to read the request rule 250, and only in a case where the switch request 210 is to be accepted by the request acceptance unit 110 of the input/output control apparatus 100, the program is configured to issue the switch request 210.

Accordingly, it is possible to reduce the processing cost relating to the context switching between the program which operates on the OS and the OS, the switching being related to the issue request 210, as well as the processing cost of the OS or of the host system such as the VMM, on which the input/output control apparatus 100 operates.

Second Embodiment (Input/Output Control System)

FIG. 3 shows a system configuration of a multiple OSs environment including an input/output control apparatus 100 according to a second embodiment.

An input/output control system according to the second embodiment is provided with an OS 340, an OS 350, a program 360, a program 370, an input device 310, an output device 320, and a VMM 330. The programs 360 and 370 operate on the OSs 340 and 350, respectively.

Moreover, the OS 340 is provided with the input/output control apparatus 100, an output device controller unit 342 capable of controlling the output device 320, and an input device controller unit 341 capable of controlling the input device 310.

Furthermore, the OS 350 is provided with a virtual input device controller unit 351, and a virtual output device controller unit 352.

Here, the OS 340 is assumed to be the secure OS, which is described in the first embodiment, and the OS 350 is assumed to be a general OS, for example.

It is assumed that the input device controller unit 341, and the output device controller unit 342 have functions as device drivers for controlling devices, respectively, and are extended for the purpose of operating in cooperation with the input/output control apparatus 100.

Moreover, the virtual input device controller unit 351 and the virtual output device controller unit 352 operate as if they are device drivers to the OS 350 and the program 370.

Actually, the virtual input device controller unit 351 is an interface between the input device controller unit 341 and the OS 350, and relays data communications between the input device 310 and the OS 350.

Furthermore, the virtual output device controller unit 352 is an interface between the output device controller unit 342 and the OS 350, and relays data communications between the output device 320 and the OS 350.

Specifically, the virtual input device controller unit 351 is configured to input information inputted from the input device 310, which has been passed from the input device controller unit 341, to the OS 350.

Moreover, the virtual output device controller unit 352 is configured to pass information outputted from the OS 350 to the output device controller unit 342.

Actually, the data communications between and over these OSs are performed by use of a communications function between OSs, the communications function being provided by the VMM 330.

In the second embodiment, firstly, descriptions will be provided of how the input device controller unit 341 and the output device controller unit 342 operate using input destination information 230 as well as output enable information 240.

The input/output control apparatus 100 outputs input destination information 230 to the input device controller unit 341, and also outputs output enable information 240 to the output device controller unit 342.

The input device controller unit 341 is driven when input information is inputted externally to the input device 310.

A process, in which the operational control moves to the input device controller unit 341 when a hardware interrupt regarding input occurs, is dependent on the operation of the VMM 330. An example of the process is described in detail in the chapter "Interrupt and Event Handling", beginning from the paragraph "0138" of the Patent document 1.

The input device controller unit 341 can specify, on the basis of the input destination information 230, which OS occupies the input device 310 at the time. Accordingly, the input device controller unit 341 inputs the input information to the specified OS.

For example, in a case where the OS 340 occupies the input device 310, the input device controller unit 341 performs the same operation as that of a normal device driver.

In a case where the OS 350 occupies the input device 310, the input device controller unit 341 inputs the input information to the virtual input device controller unit 351.

On the basis of the output enable information 240, the output device controller unit 342 can specify which OS occupies the output device 320 at the time.

In a case where the OS 340 occupies the output device 320, the output device controller unit 342 performs the same operation as that of a normal device driver.

Moreover, in a case where the OS 350 occupies the output device 320, the output device controller unit 342 notifies the virtual output device controller unit 352 of the OS 350 of the situation, and receives output information of the OS 350 from the virtual output device controller unit 352 and then output the output information to the output device 320.

Furthermore, the input/output control apparatus 100 may output input destination information 230 or output enable information 240 to the virtual input device controller unit 351 or the virtual output device controller unit 352, respectively.

In such a case, only in a case where the OS 350 occupies the input device 310, the virtual input device controller unit 351 receives information inputted from the input device controller unit 340.

Moreover, only in a case where the OS 350 occupies the output device 320, the virtual output device controller unit 352 outputs output information to the output device controller unit 342.

As a result of this, it is possible to prevent occurrences of unnecessary communications between OSs, the communications being between the input device controller unit 341 and the virtual input device controller unit 351, or between the output device controller unit 342 and the virtual output device controller unit 352.

Next, descriptions as to how a switch request 210, which is a request for requesting switching of an operating system occupying the input device or the output device to another, is issued in the input/output control system configuration according to the second embodiment will be given on the basis of FIG. 4.

In FIG. 4, an assumption is made that the OS 350 is newly provided with a virtual input/output control apparatus 351A.

As described in the case of the first embodiment, a switch request 210 is roughly classified into four types including the switch requests triggered by the external input 211, the OS process 212, the VMM process 213, and the OS state change 214, respectively.

For example, when a user presses a switching button previously provided by the computer, a switch request 210 triggered by the external input 211 is issued, and the switching of the OS occupying the device to another is performed.

In this case, a switching button control driver 343 detects that the switching button has been pressed, and then notifies the input/output control apparatus 100 of the situation.

In a case where the switching button and the input device are the same, when the inputted information is information related to a switch request 210, the switching button control driver 343 issues the switch request 210, otherwise, the switching button control driver 343 operates as the input device controller unit 341.

As to the switch request 210 triggered by the OS process 212, consider a case where the switch request 210 is issued by the program 360 or 370, which operates on an OS, and which uses a GUI, for example.

In a case where the program 360 issues the switch request 210, since the program is on the same OS as that of the input/output control apparatus 100, the program 360 issues the switch request 210 by issuing a system call to the input/output control apparatus 100.

For example, in a case where a UNIX-based OS (UNIX is a registered trademark) is assumed to be used, the input/output control apparatus 100 is previously abstracted for the OS 340 as a device file (/dev/ioctl or the like), and the program 360 issues an ioctl system call to the device file.

Since an ioctl system call can transmit a unique request for each device file, it is possible to generate and issue the switch request 210 described in the first embodiment.

The program 370 is not capable of issuing a system call directly to the input/output control apparatus 100, since the program 370 exists on the OS different from the OS on which input/output control apparatus 100 exists.

Accordingly, the virtual input/output control apparatus 351A, which relays a switch request 210 to the OS 350, is provided. Then, the virtual input/output control apparatus 351A notifies the input/output control apparatus 100 of the switch request 210 by use of a communications function between OSs.

The communications between the program 370 and the virtual input/output control apparatus 351A can be realized by the same means as that of the communications between the program 360 and the input/output control apparatus 100.

When the switch request 210 triggered by the VMM process 213 is to be issued, simple communications means such as a signal from the VMM 330 is used.

Alternately, a virtual exception, which is described in the chapter "Handling Virtualized Processor Exceptions" beginning from the paragraph "0095" of the Patent document 1 may be used, the virtual exception being issued from the VMM to an OS.

Since only one VMM 330 exists in the system, such a signal may be statically defined.

The input/output control apparatus 100 just needs to confirm that the source of the issuance of the signal is the VMM 330.

As to the switch request 210 triggered by the OS state change, a case where a state change detection function exists on a specific OS or the VMM is assumed.

In this case, by use of any of the means described above, the notification of the switch request 210 can be realized.

(Operation and Effects)

According to the present embodiment, all of the OSs including the OS 340 and OS 350 can share the input device 310 as well as the output device 320, since the specific OS 340 includes means (the input device controller unit 341 and the output device controller unit 342), which controls the input device 310 and the output device 320.

Moreover, according to the present embodiment, as long as only the specific OS 340 can securely operate, it is possible to prevent the input device 310 or the output device 320 from being occupied in an unauthorized manner due to a malfunction of another OS, which is the OS 350, or a malicious operation or the like.

Moreover, according to the present embodiment, because of the virtual input device controller unit 351 or the virtual output device controller unit 352, being provided to each OS, only in a case where one of the OSs occupies the input device 310 or the output device 320, communications between the OSs for communications with the input device controller unit 341 or the output device controller unit 342 occurs.

Accordingly, it is possible to suppress occurrences of unnecessary communications between the OSs.

Moreover, according to the present embodiment, it is made possible for a program operating on an OS, which does not occupy the input/output devices, to request the OS to issue a switch request 210.

For example, when a program is to output output information such as an image or texts on a display device, the program requests an OS to issue a switch request 210 for the first time.

Upon receipt of the request, the OS issues a switch request 210 to the input/output control apparatus 100.

As a result of this, even when the program is in operation, it is possible for another OS to occupy the input/output devices until the very last moment when an input/output event occurs.

Third Embodiment

In a third embodiment, descriptions will be provided of a case where each OS is provided with the input device controller unit and the output device controller unit.

An input/output control system according to the third embodiment is provided with an OS 440, an OS 450, a program 460, a program 470, an input device 410, an output device 420, and a VMM 430, as shown in FIG. 5. The programs 460 and 470 operate on the OSs 440 and 450, respectively.

The OS 440 is provided with an input device controller unit 441, and an output device controller unit 442. The OS 450 is provided with an input device controller unit 451, and an output device controller unit 452.

Furthermore, the VMM 430 is provided with an input/output control apparatus 100.

In the third embodiment, each of the OSs, which are the OS 440 and OS 450, includes the input device controller unit 441 or 451, and the output device controller unit 442 or 452, which respectively control the input device 410 and the output device 420.

By implementing such a configuration, performance related to input/output operations is improved in comparison with the system described in the second embodiment.

Specifically, improvements in input/output rates, or reduction in use of resources can be expected.

This is because processing related to the switching between OSs can be eliminated, since it is possible for each of the device drivers to directly control input/output devices without paying attention to another OS other than the OS, to which the drive belongs.

In such a system configuration, it is necessary to resolve a situation where input device controller units or output device controller units, which belong respectively to multiple OSs, refer to a single input or output device at the same time. This situation is so-called, a hardware conflict situation.

Accordingly, when generating control information 121, the input/output control apparatus 100 outputs input destination information 230 or output enable information 240 to all of the device controller units including the input device controller units 441 and 451, or the output device controller units 442 and 452.

For example, it is conceivable to use a method in which input destination information 230 or output enable information 240 is outputted to a main storage system capable of being read by all the OSs including the OS 440 and OS 450, and of being read and written by the VMM 430.

On the basis of the input destination information 230 or the output enable information 240, each of the input device controller units 441 and 451, or each of the output device controller units 442 and 452 specifies whether or not each of OSs, to which each of the device controller units belongs, occupies the input device 410 or the output device 420.

Then, only in a case where the OS occupies the input device 410 or the output device 420, the input device controller unit or the output device controller unit belonging to the OS controls the input device 410 or the output device 420.

The input device controller unit 411 is driven upon occurrence of a hardware interrupt from the input device 410, in a similar manner to that described in the second embodiment.

In a case where input device controller units, which operate on multiple OSs, correspond to one IRQ (Interrupt ReQuest) line as in the present system configuration, the VMM described in the Patent document 1 or the Non-patent document 1 sequentially drives these input device controller units, and thereby, it is made possible for each of the input device controller units having been called to make a judgment on whether or not to refer to the input device 410.

By use of this scheme, the input device controller unit 441, which has been driven, drives the processing as the corresponding driver, in a case where the OS 440 is determined to occupy the input device 410 based on the input destination information 230. It should be noted that the input device controller unit 451 performs the same operation.

The output device controller unit 442 outputs output information of the OS 440 to the output device 420, when it is determined that the OS 440 occupies the output device 420, based on the output enable information 240. It should be noted that the output device controller unit 452 performs the same operation.

As another configuration in a case where each of OSs is provided with an input device controller unit and an output controller unit, the configuration shown in FIG. 6 is also conceivable.

Although the configuration shown in FIG. 6 is roughly the same as the aforementioned configuration in FIG. 5, the VMM is newly provided with an input/output controller unit 431.

The input/output controller unit 431 is provided with communications means such as a signal or a virtual exception for communicating with each of the OSs.

By use of the communications means, the input/output controller unit 431 enables or disables the input device controller units 441 and 451 or the output device controller units 442 and 452 of each of the OSs.

For example, in a case where the OS 440 or OS 450 is the Linux, under the Linux environment, it is possible to implement or remove device drivers dynamically during kernel operations.

Accordingly, for example, in a case where the OS 440 is to occupy the input device 410 according to the input/output control apparatus 100, the input device controller unit 431 notifies the OS 440 of the situation so that the input device controller unit 441 of the OS 440 can be enabled.

Upon receipt of the notification, the OS 440 embeds the input device controller unit 441 in a kernel code.

The same processing is performed on the input device controller unit 451 or the output device controller units 442 or 452 of the other OSs including the OS 450.

Furthermore, as example of another configuration, a configuration shown in FIG. 7 is also conceivable.

In the configuration shown in FIG. 7, the VMM 430 is newly provided with an interrupt notification unit 432.

The interrupt notification unit 432 is one prepared by extending an interrupt handler, which is generally included in the VMM described in the Patent document 1 or the Non-patent document 1.

When a hardware interrupt occurs, based on the interrupt number, an interrupt handler in general makes a judgment on a device driver corresponding to which OS exits, and then, notifies the OS of the interrupt.

In a case where multiple devices corresponding to the IRQ number exist, and where device drivers controlling the devices are distributed among multiple OSs, the interrupt handler sequentially notifies the OSs of the interrupt.

When an interrupt request from the input device 410 occurs, the interrupt notification unit 432 specifies which OS to notify the interrupt by use of the input destination information 230 in the input/output control apparatus 100.

Specifically, the interrupt notification unit 432 specifies the OS, which occupies the input device at the time when the interrupt occurs, and then notifies the OS of the interrupt.

Next, in the system configuration according to the third embodiment, on the basis of FIG. 8, descriptions will be provided of how a switch request 210, which is a request to switch the OS occupying the input and output devices to another, is issued.

In FIG. 8, the OSs 440 and 450 are newly provided with virtual input/output control apparatuses 443 and 453, and the OS 440 is further provided with a switching button control driver 444, which is a device driver for a switching button.

The processing in which the programs 460 and 470 respectively issue switch requests 210 to the corresponding virtual input/output control apparatuses 443 and 453 is the same as the processing in which the program 370 issues a switch request 210 to the virtual input/output control apparatus 351A in the case of the second embodiment.

Moreover, the processing in which the switching button control driver 444 issues a switch request 210 to the virtual input/output control apparatus 443 is the same as the processing in which the switching button control driver 343 issues a switch request 210 to the input/output control apparatus 100.

Furthermore, since the input/output control apparatus 100 and a debugging function 433 of the VMM 430 exist in the same memory area, which is controlled by the VMM 430, no special function is needed when issuing a switch request 210.

When the virtual input/output control apparatuses 443 and 453 issue a switch request 210 to the input/output device 100, a "hyper call", which is an interface provided to the OS 440 by the VMM 430 is used.

As to the hyper call, descriptions are given in the clause 3.1 of the Non-patent document 1 under the same name, and descriptions are also given under the name, "trap call" in the paragraph "0062" of the Patent document 1.

These VMM-OS interfaces are used in the same manner as that of a system call in the conventional techniques.

Specifically, the VMM-OS interfaces are issued, when a privileged command, which cannot be processed by the authority of an OS on the VM, is requested to the VMM.

The hyper call in the present embodiment is realized by using the interface function provided by these conventional techniques.

Information, which is actually notified by the hyper call, is the same as that described in the first embodiment.

The input/output control apparatus 100 performs the processing described in the first embodiment for the received hyper call, when the switch request 210 is accepted.

When the switch request 210 is not accepted for some reason, the input/output control apparatus 100 returns an error to the OS.

Next, an example of an operation in a case where the VMM 430 is provided with a QoS controller unit 434, which operates in cooperation with the input/output control apparatus 100, will be described based on FIG. 9.

The QoS controller unit 434 is one generated by extending a CPU scheduler described in the chapter "scheduler" beginning from the paragraph "0093" of the Patent document 1, for example.

The QoS controller unit 434 is configured to determine allocation of hardware resources for each of OSs in accordance with the priority of processing of each of the OSs.

For example, a CPU scheduler exists for allocation of CPU control in accordance with the priority of processing of each of the OSs.

In accordance with input destination information 230 and output enable information 240, which are outputted by the input/output control apparatus 100, the QoS controller unit 434 of the present embodiment sets a high priority on the OS, which occupies the input device 410 or the output device 420, and then allocates hardware resources such as the CPU to the OS in priority.

As a result of this, for example, processing of the OS, which occupies the HID, and which is actually used by the user, are processed in priority, thereby, improving the usability.

(Operation and Effects)

According to the present embodiment, each of the OSs 440 and 450 includes means (the input device controller units 441 and 451 and the output device controller units 442 and 452) capable of controlling input/output devices, respectively.

Accordingly, only in a case where it is determined by the input/output control apparatus 100 that it is possible to input information, the input device controller units 441 and 451 input the input information from the input device 410 to the OSs 440 and 450, respectively.

Also, only in a case where it is determined by the input/output control apparatus 100 that it is possible to output output information, the output device controller units 442 and 452 output the output information respectively from the OSs 440 and 450 to the output device 420.

Accordingly, it is possible to prevent the conflict states of the input/output devices as the objects to be controlled.

Moreover, each of the OSs 440 and 450 can directly control the input/output devices, thereby, improving the processing speeds when information is inputted thereto and outputted therefrom.

Furthermore, the VMM 430 is provided with the input/output controller unit 431.

The input/output controller unit 431 is configured to enable or disable the input device controller units 441 and 451 respectively of the OSs 440 and 450, based on the input destination information 230 outputted from the input/output control apparatus 100.

The input/output controller unit 431 is also configured to enable or disable the output device controller units 442 and 452 respectively of the OSs 440 and 450, based on the output enable information 240 outputted from the input/output control apparatus 100.

As a result of this, even in a case where the OSs 440 and 450 are respectively provided with the input device controller units 441 and 451 each capable of controlling the specific input device 410, or respectively provided with the output device controller units 442 and 452 each capable of controlling the output device 420, only the OS, which is judged by the input/output control apparatus 100 to be capable of inputting and outputting information, occupies the input device 410 or the output device 420.

Accordingly, it is possible to prevent the conflict state of the input device 410 or the output device 420 from occurring.

Moreover, each of the OSs 440 and 450 can directly control the input and output devices, thereby, improving the processing speeds when information is inputted thereto and outputted therefrom.

Furthermore, the occupation of the input device 410 and the output device 420 is allowed only by a permission granted by the host system.

Accordingly, it is possible to prevent an unauthorized occupation of the input device 410 or the output device 420, which is caused by a malfunction of an OS or the like.

Moreover, in a case where an interrupt for the input device 410 occurs, the interrupt notification unit 432 being included in the VMM 430 notifies the OSs 440 and 450 of the interrupt.

The interrupt notification unit 432 also specifies the notification destination of the interrupt, based on the input destination information 230 outputted by the input/output control apparatus 100.

Accordingly, when an interrupt from the input device 410 occurs, by use of the input/output control system 100, the host system can select an OS, to which the interrupt is to be notified.

As a result of this, each of the OSs 440 and 450 can directly control the input device 410, thereby, improving the processing speeds when information is inputted thereto.

Moreover, the input information from the input device 410 is surely inputted to the OS, which occupies the input device 410.

Accordingly, it is possible to prevent an unauthorized use of the input device 410 due to a malfunction of an OS or the like.

Furthermore, the VMM 430 is provided with the QoS controller unit 434, which performs QoS control for OSs in accordance with the input destination information 230 or the output enable information 240 outputted from the input/output control apparatus 100.

Accordingly, the host system can perform the QoS control for each of the OSs, because of the input destination information 230 or the output enable information 240 outputted from the input/output control apparatus 100.

For example, a high CPU priority is allocated for processing of the OS, which occupies the HID.

As a result of this, a high CPU priority is allocated for the program, which the user actually operates, thereby, improving the usability.

Fourth Embodiment

FIG. 10 shows a system configuration of a multiple OSs environment including an input/output control apparatus 100 according to a fourth embodiment.

An input/output control system according to the fourth embodiment is provided with an OS 540, an OS 550, a GUI server 560, a GUI server 570, a GUI client 580, a GUI client 590, an input device 510, an output device 520, and a VMM 530.

The GUI servers 560 and 570 operate on the OSs 540 and 550, respectively. The GUI clients 580 and 590 operate on the GUI servers 560 and 570, respectively.

Moreover, the OS 540 is provided with the input/output control apparatus 100, an output device controller unit 542 capable of controlling the output device 520, and an input device controller unit 541 capable of controlling the input device 510.

Here, the system configuration according to the fourth embodiment is same as the system configuration described in the second embodiment. Accordingly, descriptions of differences between these system configurations will be mainly provided.

In the system according to the fourth embodiment, the GUI servers 560 and 570, as well as the GUI clients 580 and 590 exist on the OSs 540 and 550, respectively.

The GUI servers 560 and 570 are equivalent to a window manager, and collectively process inputs and outputs of all of the GUI programs on the OSs 540 and 550, respectively.

The GUI clients 580 and 590 are optional GUI programs, which let the GUI servers 560 and 570 handle the inputs and outputs, respectively.

According to an input or output process request received from the GUI client 580, the GUI server 560 processes the input or output.

Specifically, the GUI server 560 is configured to input input information from the input device 510 to the GUI client 580, and to output output information from the GUI client 580 to the output device 520.

Furthermore, the GUI server 560 is configured to perform the same process as a process for the GUI client 580, as the GUI server 570 to be a GUI client.

Communications between the GUI server 560 and the GUI server 570 are realized by use of a communications function being included in the VMM 530.

According to an input/output request received from the GUI client 590, the GUI sever 570 processes the input or output.

Specifically, the GUI server 570 is configured to input input information received from the input device 510 through the GUI server 560 to the GUI client 590, and to output output information from the GUI client 590 through the GUI server 560 to the output device 520.

The GUI server 560 further operates based on the input destination information 230 and the output enable information 240 of the input/output control apparatus 100.

Specifically, in a case where the OS 540 occupies the input device 510 or the output device 520 based on these information, the GUI server 560 processes the input and output of the GUI client 580.

Moreover, in a case where the OS 550 occupies the input device 510 or the output device 520, the GUI server 560 notifies the GUI server 570 of the situation.

The GUI server 570 let the OS 550 handle the input and output process only in a case where based on the notification it is found out that the OS 550 occupies the input device 510 or the output device 520.

On the other hand, in a case where the OS 550 neither occupies the devices, the GUI server 570 does not let the OS 550 handle the input and output of the GUI client 590.

Communications between the GUI server 560 and the input/output control apparatus 100 are realized by a system call, for example.

Fifth Embodiment

FIG. 11 shows a system configuration of a multiple OSs environment including an input/output control apparatus 100 according to a fifth embodiment.

The configuration of an input/output control system according to the fifth embodiment is roughly the same configuration as that of the input/output control system shown in the case of the second embodiment.

Specifically, an OS 650 or a program 670, which operates on the OS 650, is configured to receive input information from an input device as the object to be controlled, through virtual input device control software 651, and to output output information to output device control software 642 through virtual output device control software 652.

Part of the present embodiment, which differs from the second embodiment, is a program 660 and a program 670. Hereinafter, descriptions of operations of the program 660 and the program 670 will be provided.

It should be noted that, hereinafter, although the descriptions thereof will be given with the program 660 as the object, by replacing the relationship between the program 660 and the input device control software 641, or between the program 660 and the output device control software 642 with the relationship between the program 670 and the virtual input device control software 651, or between the program 670 and the virtual output device control software 652, the descriptions thereof apply to the program 670 as well.

In general, the Linux, the Windows (registered trademark), or the like, which is a general purpose OS, includes an interface for receiving requests from programs, and for executing a privileged process capable of being executed with only an OS authority. For this interface, a program issues a system call.

In order for the program 660 to receive information through the input device control software 641 or to output information through the output device control software 642, system calls dedicated respectively for receiving and outputting information are required.

For example, in the Linux, a system call for receiving input information is equivalent to a read system call, and a system call for outputting output information is equivalent to a write system call.

The processing of these system calls requires a context switch between the program, which has issued the system call, and the OS. Accordingly, a large processing cost is generated.

In the present embodiment, the number of issuances of the system calls is reduced, since the program 660 performs specific processing. Accordingly, it is made possible to reduce the overhead of the overall system.

The input/output control apparatus 100 in the case of the present embodiment outputs control information 121 to an area to which the program 660 can refer.

For example, the input/output control apparatus 100 outputs the control information 121 to a shared memory, which is used when the aforementioned communications between OSs are performed.

As a result of this, the program 660 can read the control information 121 and then determines whether or not to issue a system call in accordance with the content of the control information 121.

Specifically, only in a case where the OS 640 occupies the input device 610 or the output device 620 as the object to be controlled according to the control information 121, the program 660 issues the corresponding system call.

As a result of this, the issuance of a system call can be saved in a case where it is impossible to execute the input/output to the input/output devices, because of an absence of an occupation authority, although a system call is issued. Accordingly, it is possible to reduce the overhead.

As a device capable of reducing the issuance of such a system call, an audio device can be cited as an example.

Normally, an output to an audio device needs to be generated from a program in real-time.

Specifically, in a case where audio data cannot be outputted because the OS does not occupy the audio device at the certain time, it is hardly conceivable at the time of normal use that the audio data is accumulated, and then outputted when the OS occupies the audio device.

Accordingly, in a case where the OS 640 does not occupy the audio device, the program 660, which outputs the audio data, can ignore the audio information to be outputted, and does not need to issue the unnecessary system call.

On the other hand, as a device not capable of reducing such a system call, a display device can be cited as an example.

Output information included in each of OSs to a display device needs to be accumulated in a frame buffer memory of each of the OSs and updated, regardless of the state whether or not the OS occupies the display device.

By the aforementioned manner, even in a case where the occupation authority of the display device switches from one to another, the user can accurately grasp the status of the OS at that time from the display device.

Accordingly, the OS needs to update its own frame buffer memory always, and to continue receiving output information from the program 660, regardless of the content of the control information 121.

As described above, in order to change the operation to another by referring to the control information 121, modification may be applied to the program 660.

Specifically, the program 660 can include the steps of referring to control information 121 as to part of a code where inputs and outputs occur, and determining whether or not to issue a system call in accordance with the content of the control information 121.

However, the changing of the content of the program 660 corresponding to the system is a large burden on the programmer, and the advantage of the VMM being capable of operating without changing the program 660 is eliminated.

Furthermore, it is very difficult for the programmer to judge whether or not it is needed to modify the program based on the aforementioned differences in devices.

In the implementation of the present embodiment, realistic means is not to make modification directly on the program 660, rather to make modification on an API 661, which is called by the program 660 at the time of inputs and outputs.

In general, a programmer does not embed a system call directly in a code, and rather, creates a program, by which a system call is issued indirectly by calling an API provided by the system.

Use of an API makes programming easier, and also improves the usability in comparison with use of a code, which directly calls a system call.

Furthermore, such an API is provided to each device. Accordingly, the modification is to be applied to only an API for calling a device, for which a judgment on whether or not to issue a system call is required to be made.

Then, the API may be configured to include the steps of referring to the control information 121, determining whether or not to issue a system call in accordance with the result of the reference, and issuing a system call in accordance with the determination.

Thereby, the creator of the program 660 does not need to be involved with any of the changes related to the present embodiment.

Furthermore, the number of issuance of system calls can be suppressed, and thereby the performance of the overall system is improved.

(Operation and Effects)

According to the present embodiment, the program 660, which operates on the OS 640, refers to the control information 121 and then makes a judgment on whether or not the OS 640 occupies the input device 610 or the output device 620 at that time.

Then, the program 660 issues a system call related to inputs and outputs to the OS, only in a case where the OS 640 occupies the input device 610 or the output device 620 at that time.

Accordingly, it is possible to reduce the processing costs related to the issuance of unnecessary system calls.

Additional advantages and modifications will readily occur to those skilled in the art. Therefore, the invention in its broader aspects is not limited to the specific details and the representative embodiments shown and described herein. Accordingly, various modifications may be made without departing from the scope of the general inventive concept as defined by the appended claims and their equivalents.

What is claimed is:

1. An input/output control system comprising:
   at least one input device;
   at least one output device;
   an input/output control apparatus which controls an input of the input device and an output of the output device; and
   a host system including a function of simultaneously running a plurality of operating systems, each of the plurality of operating systems including input device control software and output device control software to relay input and output of information,
   the input/output control apparatus including,
      a request acceptance unit configured to judge whether or not to accept, based on predetermined conditions, a switch request for switching an operating system occupying any one of the input device and the output device to another one of the plurality of operating systems,
      a control information generator unit configured to generate control information in response to the switch request, when the request acceptance unit accepts the switch request, the control information including any one of
         input destination information including information to specify a switch destination operating system, included in the switch request, as an input destination operating system occupying an input device which is an input destination for input information received from the input device, and
         output enable information including information to specify a switch destination operating system, included in the switch request, as an output enable operating system occupying an output device which is an output source of output information addressed to the output device, and
      a control information output unit configured to output any one of the input destination information and the output enable information, wherein
   a program, which operates on the operating system, is configured to issue a system call for the input device control software to relay the input information received from the input device to the operating system occupying the input device, via an input device controller unit, is itself specified as an input destination operating system from the input device according to the input destination information,
   the program is configured to issue a system call for the output device control software to relay the output information received from the operating system, to an output device, controller unit, when the operating system itself is specified as an output destination operating system according to the output enable information,
   the input destination information includes at least information for specifying the input destination information operating system for input information from the input device, and
   the output enable information includes at least information for specifying whether or not each of the plurality of operating systems can output information to the output device, and
   the control information generator unit is configured to determine which of the plurality of operating systems occupies any one of the input device and the output device based on a device list of input and output devices.

2. An input/output control apparatus which controls an input of an input device and an output of an output device, comprising:
   a request acceptance unit configured to accept, based on predetermined conditions, a switch request for switching an operating system occupying any one of the input device and the output device to another one of a plurality of operating systems;

a control information generator unit configured to generate control information in response to the switch request, when the request acceptance unit accepts the switch request, the control information including any one of input destination information including information to specify a switch destination operating system, included in the switch request, as an input destination operating system occupying an input device which is an input destination for input information received from the input device, and output enable information including information to specify a switch destination operating system, included in the switch request, as an output enable operating system occupying an output device which is an output source of output information addressed to the output device; and a control information output unit configured to output any one of the input destination information and the output enable information, wherein a program, which operates on the operating system, is configured to issue a system call for input device control software to relay the input information received from the input device to the operating system occupying the input device, via an input device controller unit, when the operating system is itself specified as an input destination operating system from the input device according to the input destination information, the program is configured to issue a system call for the output device control software to relay the output information received from the operating system, to an output device controller unit, when the operating system itself is specified as an output destination operating system according to the output enable information, the input destination information includes at least information for specifying the input destination information operating system for input information from the input device, and the output enable information includes at least information for specifying whether or not each of the plurality of operating systems can output information to the output device, and the control information generator unit is configured to determine which of the plurality of operating systems occupies any one of the input device and the output device based on a device list of input and output devices.

3. An input/output control method to control an input of an input device and an output of an output device, comprising:

receiving, at a request acceptance unit, a switch request for switching an operating system, from a plurality of operating systems, occupying any one of the input device and the output device to another one of the plurality of operating systems;

judging, at the request acceptance unit, whether or not to accept the switch request based on predetermined conditions, generating control information in a control information generating unit in response to the switch request when the switch request is accepted in the judging step, the control information including any one of input destination information including information to specify a switch destination operating system, included in the switch request, as an input destination operating system occupying an input device which is an input destination for input information received from the input device, and output enable information including information to specify a switch destination operating system, included in the switch request, as an output enable operating system occupying an output device which is an output source of output information addressed to the output device;

determining which of the plurality of operating systems occupies any one of the input device and the output device according to a device list of input and output devices; and outputting, from a control information output unit, any one of the input destination information and the output enable information, wherein a program, which operates on the operating system, is configured to issue a system call for input device control software to relay the input information received from the input device to the operating system occupying the input device, via an input device controller unit, when the operating system is itself specified as an input destination operating system from the input device according to the input destination information, the program is configured to issue a system call for the output device control software to relay the output information received from the operating system, to an output device controller unit, when the operating system itself is specified as an output destination operating system according to the output enable information, the input destination information includes at least information for specifying the input destination information operating system for input information from the input device, and the output enable information includes at least information for specifying whether or not each of the plurality of operating systems can output information to the output device, and determining, in the control information generator unit, which of the plurality of operating systems occupies any one of the input device and the output device based on a device list of input and output devices.

* * * * *